(12) United States Patent
Hosseini et al.

(10) Patent No.: US 12,506,560 B2
(45) Date of Patent: Dec. 23, 2025

(54) TIMELINE AND RESOURCE ASSIGNMENT FOR DOWNLINK TRIGGERED CSI REPORTS

(71) Applicant: QUALCOMM Incorporated, San Diego, CA (US)

(72) Inventors: Seyedkianoush Hosseini, San Diego, CA (US); Wei Yang, San Diego, CA (US); Yi Huang, San Diego, CA (US); Wanshi Chen, San Diego, CA (US); Krishna Kiran Mukkavilli, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 17/904,783

(22) PCT Filed: Feb. 24, 2020

(86) PCT No.: PCT/CN2020/076341
§ 371 (c)(1),
(2) Date: Aug. 22, 2022

(87) PCT Pub. No.: WO2021/168598
PCT Pub. Date: Sep. 2, 2021

(65) Prior Publication Data
US 2023/0057047 A1 Feb. 23, 2023

(51) Int. Cl.
*H04L 1/1607* (2023.01)
*H04L 1/1812* (2023.01)
*H04W 72/23* (2023.01)

(52) U.S. Cl.
CPC .......... *H04L 1/1671* (2013.01); *H04L 1/1812* (2013.01); *H04W 72/23* (2023.01)

(58) Field of Classification Search
CPC ..... H04L 1/1671; H04L 1/1812; H04W 72/23
See application file for complete search history.

(56) References Cited

U.S. PATENT DOCUMENTS 10,104,568 B2 10/2018 Chen et al.
11,356,989 B2 6/2022 Zhang et al.
(Continued)

FOREIGN PATENT DOCUMENTS

CN 107211306 A 9/2017
CN 110249568 A 9/2019
(Continued)

OTHER PUBLICATIONS

PANASONIC: "Discussion on UCI and PUCCH Enhancement for URLLC", 3GPP Draft, 3GPP TSG RAN WG1 Ad-Hoc Meeting 1901, R1-1900400, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593314, 8 pages, last paragraph + proposal 3; p. 2 section 4; p. 6.
(Continued)

*Primary Examiner* — Jael M Ulysse
(74) *Attorney, Agent, or Firm* — ArentFox Schiff LLP

(57) ABSTRACT

A user equipment (UE) receives downlink communication that triggers a channel state information (CSI) report. Then the UE determines whether to report CSI together with hybrid automatic repeat request (HARQ) feedback. Then the UE transmits the CSI and the HARQ feedback based on the determining whether to report the CSI together with the HARQ feedback.

26 Claims, 15 Drawing Sheets

(56) References Cited

U.S. PATENT DOCUMENTS

| | | | |
|---|---|---|---|
| 2012/0140708 A1* | 6/2012 | Choudhury | H04L 1/0027 370/328 |
| 2013/0121271 A1 | 5/2013 | Chen et al. | |
| 2014/0036704 A1* | 2/2014 | Han | H04L 41/082 370/252 |
| 2014/0204856 A1* | 7/2014 | Chen | H04L 5/0057 370/329 |
| 2014/0269591 A1* | 9/2014 | Dinan | H04B 7/0634 370/329 |
| 2015/0131568 A1* | 5/2015 | You | H04L 5/001 370/329 |
| 2015/0365925 A1* | 12/2015 | Fu | H04W 72/21 370/329 |
| 2016/0192388 A1* | 6/2016 | Ekpenyong | H04L 5/0092 370/329 |
| 2016/0285535 A1* | 9/2016 | Kim | H04W 24/08 |
| 2017/0170940 A1* | 6/2017 | Lee | H04W 72/0446 |
| 2017/0279583 A1* | 9/2017 | Dinan | H04L 5/0053 |
| 2018/0091992 A1* | 3/2018 | Frenne | H04B 7/0626 |
| 2018/0287765 A1* | 10/2018 | Lee | H04W 24/08 |
| 2019/0319758 A1* | 10/2019 | Yum | H04L 5/0051 |
| 2020/0220697 A1* | 7/2020 | Lee | H04L 5/1469 |
| 2020/0295903 A1* | 9/2020 | Faxér | H04L 5/0057 |
| 2021/0092759 A1* | 3/2021 | Xiong | H04W 72/0446 |
| 2021/0297118 A1* | 9/2021 | Kwak | H04B 7/0417 |
| 2022/0094479 A1* | 3/2022 | Gao | H04L 5/0057 |
| 2022/0150950 A1* | 5/2022 | Islam | H04L 1/1812 |
| 2022/0352950 A1* | 11/2022 | Faxér | H04B 7/0626 |
| 2023/0080211 A1* | 3/2023 | Takahashi | H04W 72/23 370/329 |
| 2023/0093335 A1* | 3/2023 | Harrison | H04B 7/0617 370/329 |

FOREIGN PATENT DOCUMENTS

| | | |
|---|---|---|
| EP | 3706490 A1 | 9/2020 |
| WO | 2017003878 | 1/2017 |
| WO | 2019098693 A1 | 5/2019 |
| WO | 2019139439 A1 | 7/2019 |
| WO | 2019192459 A1 | 10/2019 |

OTHER PUBLICATIONS

Supplementary European Search Report—EP20921803—Search Authority—Munich—Octt. 24, 2023.

CATT: "Multiplexing of UCI Transmissions of Different Durations or Configurations", 3GPP Draft, 3GPP TSG RAN WG1 Meeting #92, R1-1801731, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018 Feb. 17, 2018 (Feb. 17, 2018), XP051397712, 9 Pages, Retrieved from the Internet: URL:http://www.3gpp.org/ftp/tsg%5Fran/WG1%5FRL1/TSGR1%5F92/Docs/ [retrieved on Feb. 17, 2018] Section 2, Section 2.1.

HUAWEI., et al., "UL Intra-UE Multiplexing Between Control Channels" 3GPP TSG RAN WG1 Meeting #97, R1-1907547, Reno, USA, May 13-17, 2019, May 17, 2019 (May 17, 2019) The Whole Document, 4 Pages.

International Search Report and Written Opinion—PCT/CN2020/076341—ISA/EPO—Nov. 26, 2020.

* cited by examiner

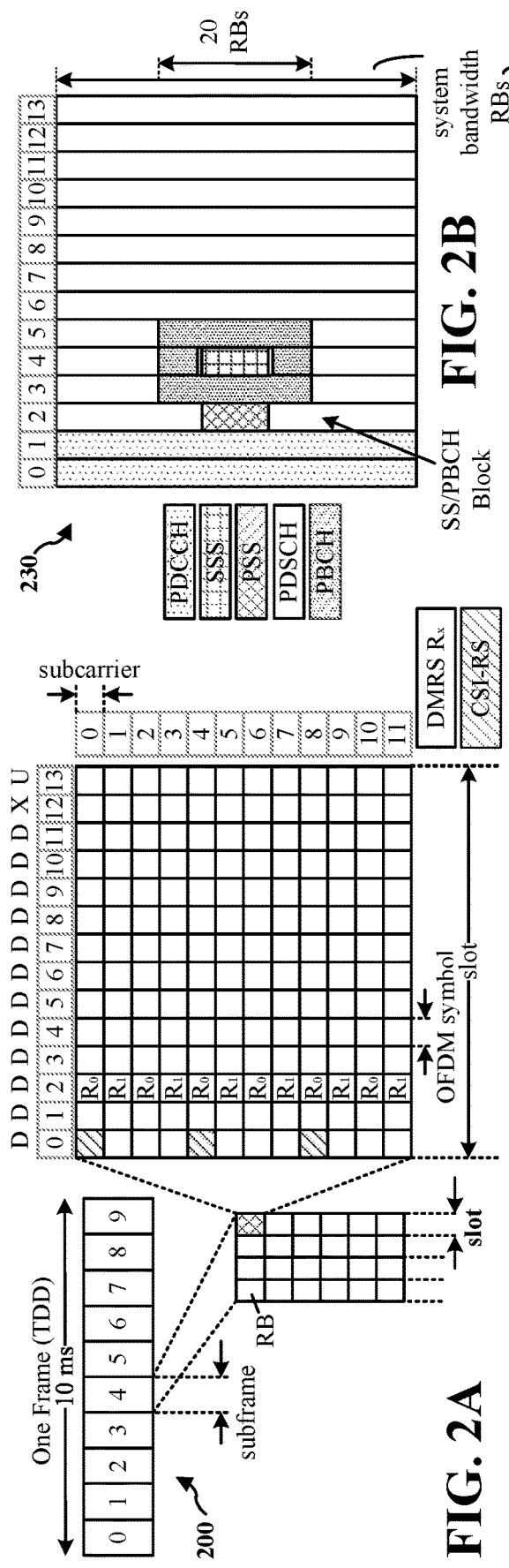
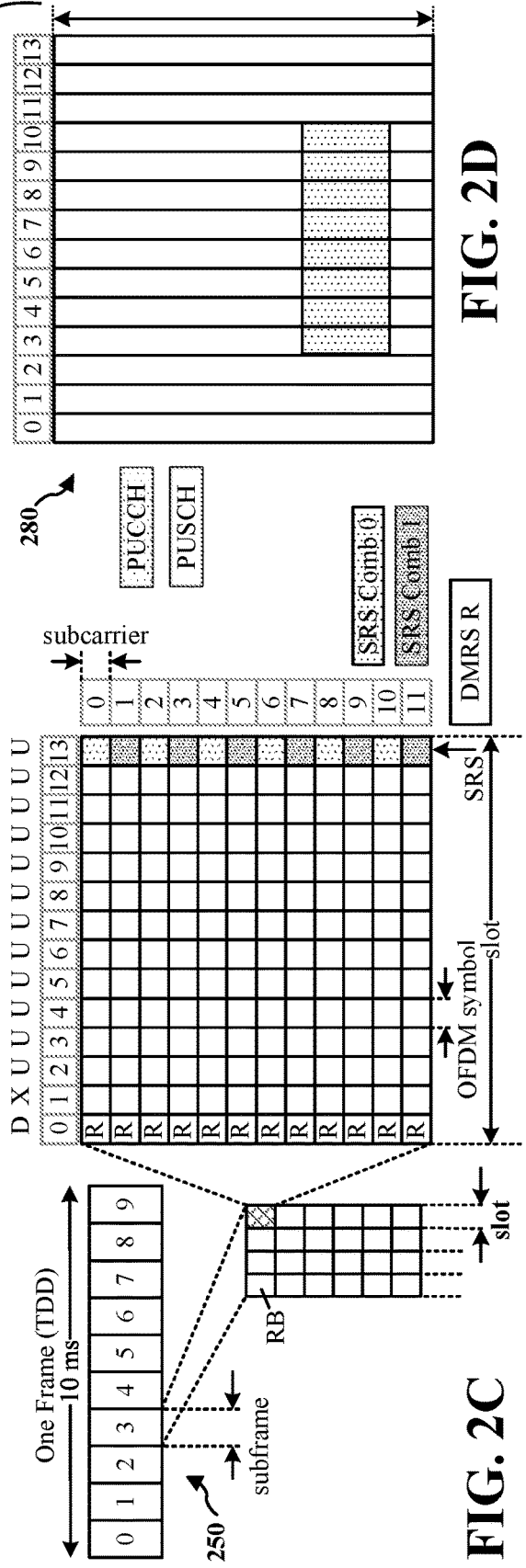
FIG. 2A
FIG. 2B
FIG. 2C
FIG. 2D

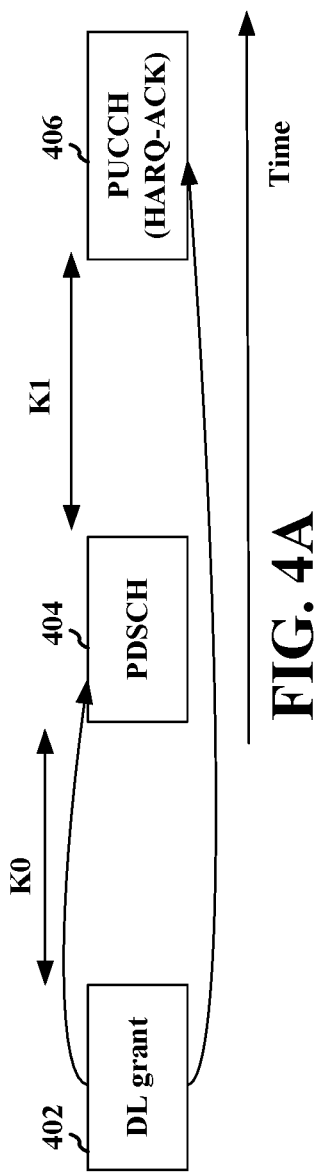
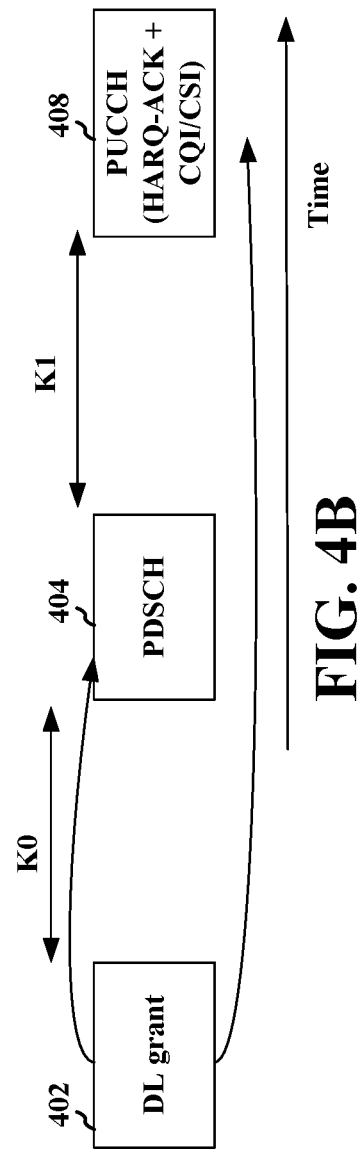

TIMELINE AND RESOURCE ASSIGNMENT FOR DOWNLINK TRIGGERED CSI REPORTS

CROSS REFERENCE TO RELATED APPLICATION(S)

This application is a National Phase entry of PCT Application No. PCT/CN2020/076341, entitled "TIMELINE AND RESOURCE ASSIGNMENT FOR DOWNLINK TRIGGERED CSI REPORTS" and filed on Feb. 24, 2020, which is expressly incorporated by reference herein in its entirety.

BACKGROUND

Technical Field

The present disclosure relates generally to communication systems, and more particularly, to a wireless communication involving Channel State Information reporting.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein improve the ability of a base station to perform faster and more accurate adaptation of a modulation and coding schemes (MCS), a code rate and/or transmission power by enabling channel state information (CSI) reporting with hybrid automatic repeat request (HARQ) feedback.

In an aspect of the disclosure, a method, a computer-readable medium, and an apparatus are provided for wireless communication at a user equipment (UE). The apparatus receives downlink communication that triggers a CSI report. The apparatus determines whether to report CSI together with hybrid automatic repeat request HARQ feedback. The apparatus transmits the CSI and the HARQ feedback based on the determining whether to report the CSI together with the HARQ feedback.

In an aspect of the disclosure, a method, a computer-readable medium, and an apparatus are provided for wireless communication at a base station. The apparatus transmitting downlink communication that triggers a CSI report. The apparatus indicates to the UE whether to report CSI together with HARQ feedback. The apparatus receives the CSI and the HARQ feedback based on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 4A and 4B are example timelines for HARQ-ACK/NACK and HARQ-ACK/NACK with CSI/CQI reporting.

DETAILED DESCRIPTION

Figure 1:
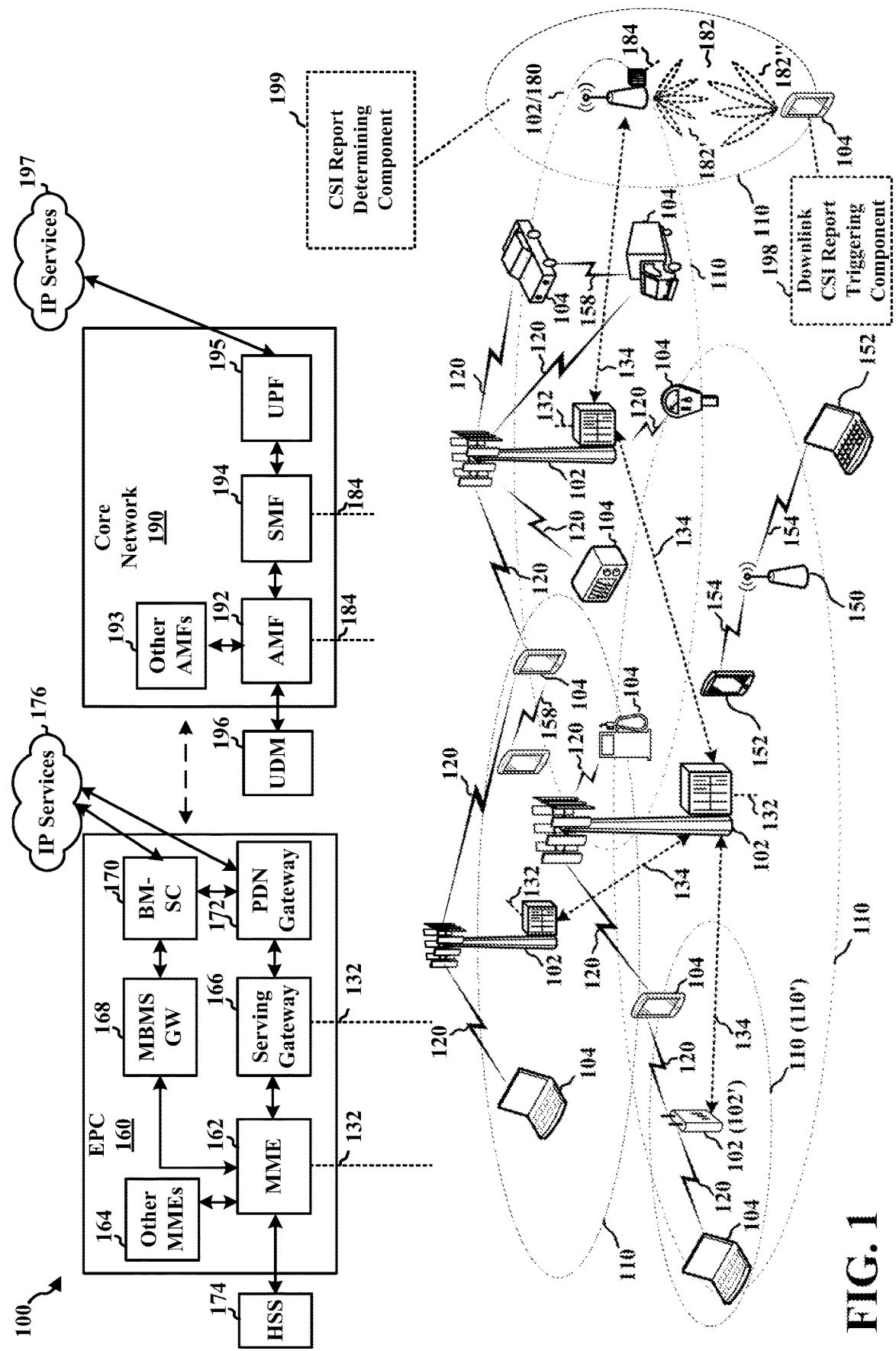
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a downlink CSI report component 198 configured to transmit, to the base station 102 or 180, CSI reports. The downlink CSI report component 198 may be configured to receive a downlink communication from the base station 102 or 180 that triggers a CSI report. Then, the downlink CSI report component 198 may be configured to determine whether to report CSI together with hybrid automatic repeat request (HARQ) feedback. Then the downlink CSI report component 198 may be configured to transmit the CSI and the HARQ feedback based on the determining whether to report the CSI together with the HARQ feedback. The event may be an autonomous event determined by the UE or may be based on a configuration from the base station. The base station 102 or 180 may include a CSI report determining component 199 that configures the UE 104 for the uplink CSI report from the UE 104.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
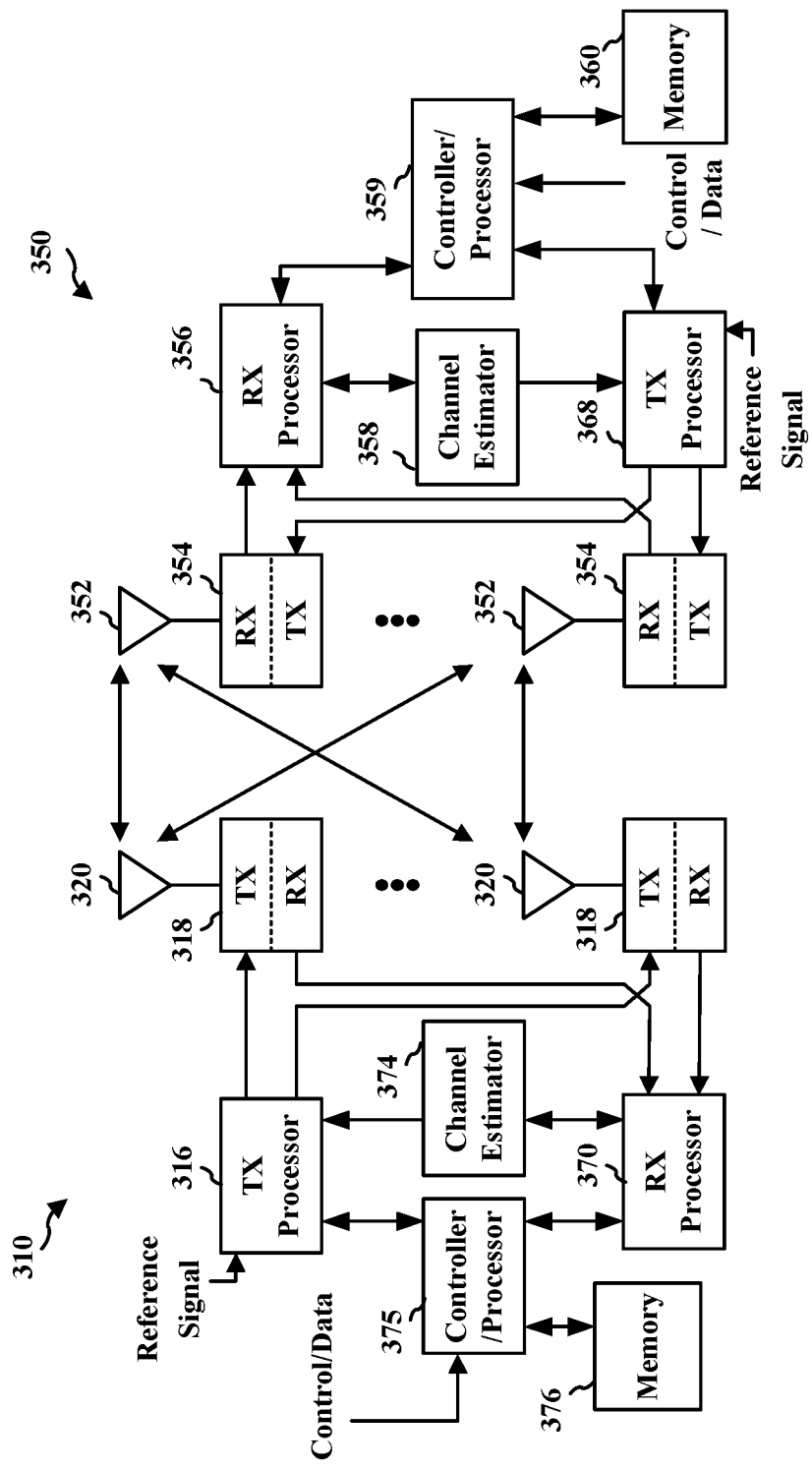
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

FIG. 4A illustrates an example timeline of HARQ-ACK/NACK reporting. A transmission interval (e.g., K0) may occur between a UE receiving a DL grant 402 in a transmission (e.g., PDCCH) from the base station and the UE receiving a PDSCH transmission 404 from the base station based on the DL grant 402. The UE may determine the time interval K0 based on a table and/or information in the DL grant 402. For example, the UE may determine K0 based on a Time Domain Resource Allocation (TDRA) table in the DL grant, e.g., such as for DCI format 1_0, 1_1 or 1_2. Thus, information in the PDCCH may be used to determine the transmission interval (i.e., time gap) between the PDCCH transmission (e.g., DL grant 402) and the PDSCH transmission 404. Similarly, the base station may indicate the transmission interval (e.g., K1) between the PDSCH transmission 404 and the reception of the corresponding PUCCH 406 that carries the HARQ-ACK feedback for the PDSCH 404 in the DL grant. The DL grant 402 may be based on DCI format 1_0, 1_1 or 1_2, for example.

In CSI reporting a UE measures various radio channel qualities and reports the measurements to a base station. The base station may then use the CSI report to adjust and improve the transmission quality and efficiency of communication with the UE. When a base station receives a NACK from a UE, the base station may retransmit the PDSCH and/or the PDCCH after a certain period of time. However, as the NACK is not associated with a CSI/CQI report, the base station that receives the NACK may not know the channel quality and/or the channel state of the communication. Thus, the PDSCH (and/or PDCCH) may be retransmitted based on previous transmission's settings because the base station does not know whether to make adjustments for the retransmission, e.g., adapting to a different MCS, code rate and/or transmission power. This increases the amount of time for a base station to apply an adjustment to a transmission to a UE.

In addition, CSI/CQI reporting (which may be referred to as CSI/CQI feedback) may be based on periodic CSI (e.g., P-CSI) reporting or aperiodic CSI (e.g., A-CSI) reporting.

For P-CSI, the UE may report CQI, PMI, and RI through PUCCH or PUSCH with reporting periods configured by a higher layer. The UE may cycle through different subbands from one reporting instance to the next to reduce overhead. In P-CSI, the reporting period is fixed For A-CSI, the UE may divide the bandwidth into a number of subbands, select M subbands and report a CQI for the selected subbands. The A-CSI can be used to provide more detailed reporting in a single reporting instance. The report may be transmitted on a PUSCH, and the report timing is triggered by DCI. However, the A-CSI is triggered by a separate UL grant and the timeline for A-CSI reporting may be much slower than HARQ-ACK timeline. For example, the UE may provide HARQ-ACK feedback and CSI reporting in different slots even if they are scheduled at the same slot. This may cause slower adaptation of MCS, code rate and/or transmission power for retransmission at the base station.

Figure 5:
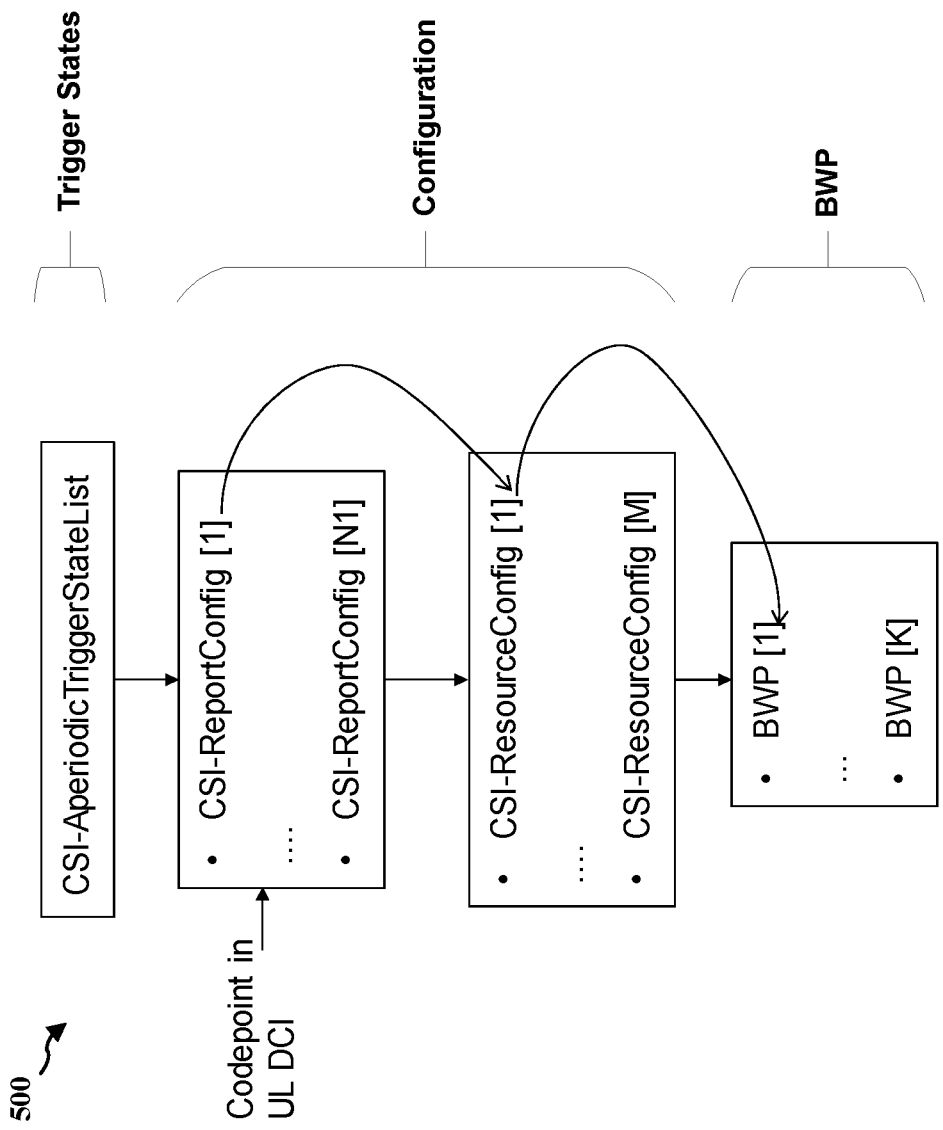
FIG. 5 is an example CSI report framework.

FIG. 5 illustrates an example A-CSI report framework 500. A-CSI trigger states may include one or more CSI report configurations, shown in the figure as CSI Report Configuration 1 through CSI Report Configuration N1. A CSI report configuration may be associated with a CSI Resource configuration that indicates resources for the reference signal (e.g., Non-zero power CSI Reference Signal, synchronization signal block, CSI-IM Resource) and may also indicate the types of the resources (e.g., periodic, aperiodic, semi-persistent). FIG. 5 illustrates CSI Resource Configuration 1 through CSI Resource Configuration M. A CSI Report Configuration may indicate which of the CSI Resource Configurations are to be used for the CSI measurement and may include a mapping table between the measurement type and the corresponding CSR Resource Configuration ID. BWP information may also be indicated. FIG. 5 illustrates an example in which CSI Report Configuration 1 is associated with CSI Resource Configuration 1 and BWP 1.

Figure 6:
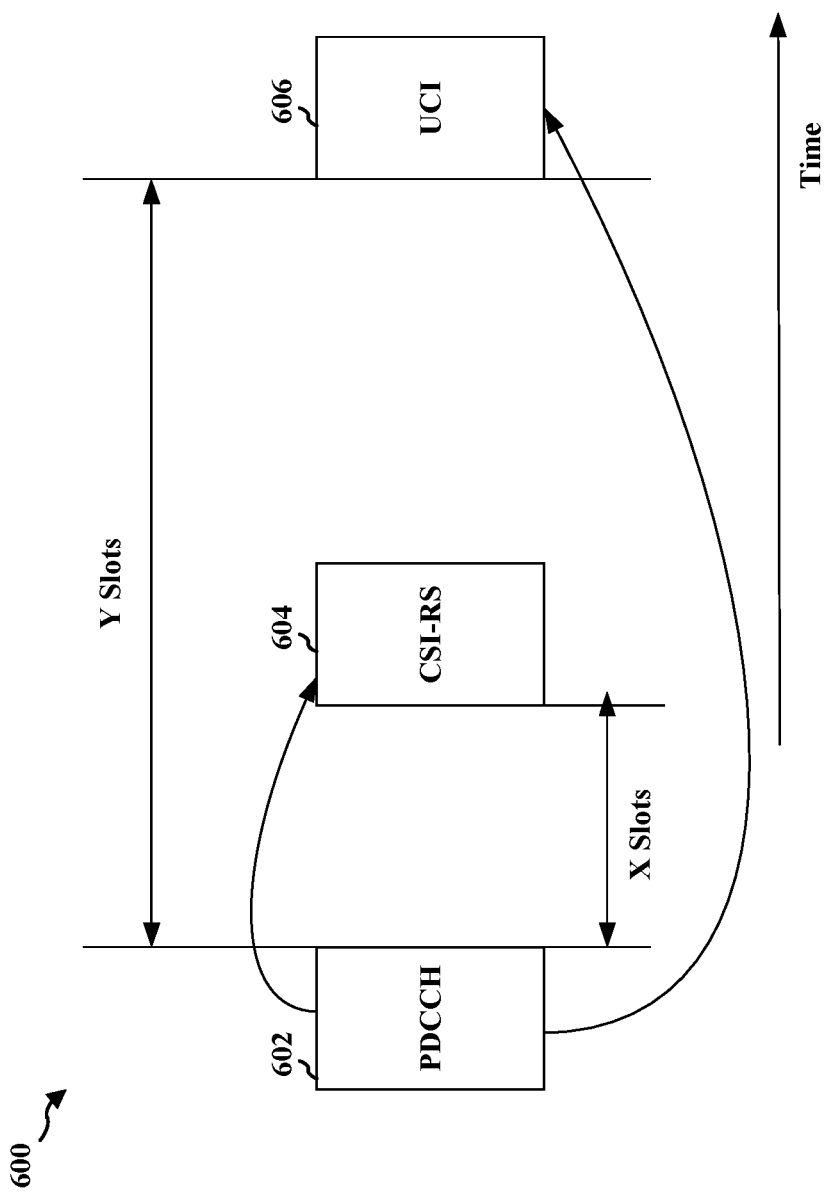
FIG. 6 is an example timeline for A-CSI reporting on PUSCH.

FIG. 6 is an example timeline 600 for A-CSI reporting. As illustrated in FIG. 6, X (e.g., X slots) represents the time gap between end of the PDCCH transmission 602 that triggers the A-CSI report and the beginning of the CSI-RS transmission 604. The base station may RRC configure each CSI-RS resource. FIG. 6 illustrates Y (e.g., Y slots) as the gap between the end of PDCCH transmission 602 and the beginning of the A-CSI report 606 on PUSCH transmission. The A-CSI report may be uplink control information (UCI) included in the PUSCH transmission. The time gap of Y slots between the PDCCH 602 and the A-CSI report 606 may be based on the time-domain resource allocation (TDRA) field in the UL grant for the corresponding PUSCH transmission. The frequency resources for the A-CSI report 606 may indicated to the UE in the UL grant (e.g., PDCCH 602) via the frequency-domain resource allocation field.

Aspects presented herein improve communication between the base station and the UE by enabling the UE to determine, at times, to transmit a CSI report with HARQ-ACK feedback.

FIG. 4B illustrates an example timeline for CSI reporting in combination with HARQ-ACK feedback. FIG. 4B illustrates the CSI/CQI reporting being associated or bundled with the HARQ-ACK reporting in a combined PUCCH transmission 408. In other words, when the UE transmits the HARQ-ACK in the PUCCH 408 to the base station, the UE may also include the CSI/CQI feedback in the PUCCH 408. The combined message or report with both HARQ-ACK feedback and CQI/CSI information enables the base station to adjust parameter(s) for the transmission or retransmission using the CSI/CQI information at earlier stage, which in turn allows the base station to select a more effective MCS, code rate and/or transmission power adaption. The CSI report may be triggered by the DL grant 402, such as using an information field in the DCI field of the DL grant 402, or triggered implicitly by a NACK or a time gap.

The DL triggered CSI report may be useful for providing more reliable transmission/retransmission for ultra-reliable low latency communication (URLLC). URLLC is a new service category to accommodate emerging services and applications having stringent latency and reliability requirements. Services and applications based on URLLC may require sub-millisecond latency with error rates that are lower than 1 packet loss in $10^5$ packets. By triggering CSI/CQI reporting through DL transmission and transmitting HARQ-ACK with CSI/CQI reporting in URLLC, the base station may improve retransmissions. This may help the UE to accurately receive communication using a reduced number of retransmissions. For example, one retransmission may be enough to provide 10' reliability and low latency (e.g., 5 ms). With the HARQ-ACK reporting described in connection with FIG. 4A, more retransmissions may be transmitted in order for the UE to accurately receive the communication, as the adaptation of MCS, code rate and/or transmission power at the base station is slower.

The DL triggered CSI reporting may include multiple types. A first type ("Type 1") may be explicitly triggered in downlink communication from a base station, such as described in connection with FIG. 4B. For example, Type 1 CSI reporting may not be triggered by a Level 1 (L1) event (e.g., PDSCH decoding failure). The Type 1 CSI reporting may be used for more flexible CSI report triggering and transmission on the PUCCH. The Type 1 CSI reporting may be triggered by DL DCI with similar aspects to the triggering of A-CSI reporting that is triggered by the UL DCI and is reported on the corresponding PUSCH.

A second type ("Type 2") may be triggered based on an implicit trigger rather than an explicit downlink message from the base station requesting the CSI. For example, the Type 2 CSI report may be triggered by a L1 event such as when there is a PDSCH decoding failure. In some aspects, the Type 2 CSI reporting may be referred to as turbo-HARQ reporting. In some examples, such Type 2 CSI reporting may be used as the last-resort HARQ operation to finish a task. For example, if a prior transmission fails, then UE can transmit a NACK and some more information about the channel condition and/or CSI/CQI feedback to the base station. The base station may use that additional information to allocate resources more accurately for the retransmission of the same packet. As the base station has more accurate information and is able to improve the retransmission, the UE may be more likely to accurately receive the retransmission and may be more likely to meet the delay budget for the communication.

Tables 1 and 2 below illustrate example aspects of HARQ-ACK and CSI preparation timelines. Tables 1 and 2 illustrate examples of PDSCH processing times, e.g., N1.

TABLE 1

PDSCH processing time for PDSCH processing capability 1

PDSCH decoding time $N_1$ [symbols]

| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
|---|---|---|
| 0 | 8 | $N_{1,0}$ |
| 1 | 10 | 13 |
| 2 | 17 | 20 |
| 3 | 20 | 24 |

TABLE 2

PDSCH processing time for PDSCH processing capability 2

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

The PDSCH decoding time $N_1$ gives, e.g., the minimum number of symbols used by the UE from the end of PDSCH transmission to the beginning of the PUCCH resource carrying the corresponding HARQ-ACK. $N_1$ is based on µ of Tables 1 and 2 for UE processing capability 1 and 2 respectively, where µ corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted etc. As shown in Tables 1 and 2, values in capability 2 (i.e., Table 2) are smaller compare to the values in capability 1 (i.e., Table 1). Generally this means capability 2 is faster and capability 1 is slower.

Tables 3 and 4 below illustrate examples of HARQ-ACK and CSI preparation timelines.

TABLE 3

CSI computation delay requirement 1

| | $Z_1$ [symbols] | |
|---|---|---|
| $\mu$ | $Z_1$ | $Z'_1$ |
| 0 | 10 | 8 |
| 1 | 13 | 11 |
| 2 | 25 | 21 |
| 3 | 43 | 36 |

TABLE 4

CSI computation delay requirement 2

| $\mu$ | $Z_1$ [symbols] | | $Z_2$ [symbols] | | $Z_3$ [symbols] | |
|---|---|---|---|---|---|---|
| | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

Z corresponds to the time gap between the end of PDCCH triggering a CSI report to the beginning of the PUSCH carrying the CSI report, and Z' is the time gap between the end of the latest CSI-RS/IM used for measurement corresponding to the CSI report and the beginning of the PUSCH carrying the CSI report. $\mu$ of Table 3 and Table 4 corresponds to the min ($\mu_{PDCCH}$, $\mu_{CSI-RS}$, $\mu_{UL}$) where the $\mu_{PDCCH}$ corresponds to the subcarrier spacing of the PDCCH with which the DCI was transmitted and $\mu_{UL}$ corresponds to the subcarrier spacing of the PUSCH with which the CSI report is to be transmitted and $\mu_{CSI-RS}$ corresponds to the minimum subcarrier spacing of the aperiodic CSI-RS triggered by the DCI.

Again referring to Table 3 and Table 4, Z and Z' may be defined as:

$$Z = \max_{m=0,\ldots,M-1} (Z_m) \text{ and } Z' = \max_{m=0,\ldots,M-1} (Z'_m),$$

where M is a number of updated CSI report(s) (Z(m),•Z'•(m)) corresponds to the m-th requested CSI report and is defined as:
- ($Z_1$, $Z_1'$) of Table 3 if the CSI is triggered without a PUSCH with either transport block or HARQ-ACK or both when L=0 CPUs are occupied and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
- ($Z_1$, $Z_1'$) of Table 4 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
- ($Z_3$, $Z_3'$) of Table 4 if reportQuantity is set to 'cri-RSRP' or 'ssb-Index-RSRP', where X$\mu$ is according to UE reported capability beamReportTiming and $KB_1$ is according to UE reported capability beamSwitchTiming, or
- ($Z_2$, $Z_2'$) of Table 4 otherwise.

Figure 7:
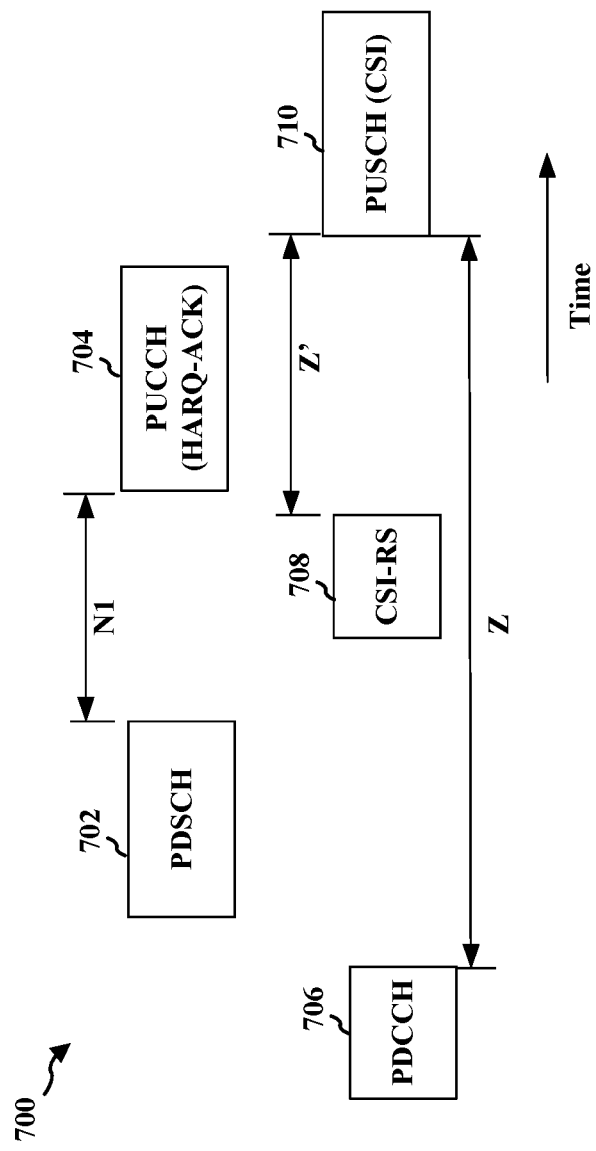
FIG. 7 is an example CSI reporting timeline showing the relationship between HARQ-ACK preparation and CSI reporting.

FIG. 7 is an example CSI reporting timeline 700 showing the relationship between the timelines for HARQ-ACK preparation ($N_1$) and CSI reporting (Z, Z') as described above. FIG. 7 illustrates that the time N1 between the PDSCH 702 and the HARQ-ACK feedback 704 for the PDSCH 702 may be smaller than an amount of time (e.g., Z) between the PDCCH 706 triggering a CSI report based on CSI-RS 708 and the transmission of the CSI report 710. As it can be seen, the processing time for CSI reporting, as shown in Tables 3 and 4, may be longer than a corresponding processing time for PDSCH reporting, as shown in Tables 1 and 2.

There may be different types of DL Triggered CSI reporting together with HARQ-ACK feedback. In a first example (which may be referred to as "Case 1"), for Type 1 DL triggered CSI report that is triggered by an explicit indication from the base station, the UE may provide feedback HARQ-ACK for the PDSCH as well as the CSI reporting triggered by its corresponding DL grant. In a second example ("Case 2"), for a Type 2 DL triggered CSI report that is based on an implicit trigger such as decoding failure, a reduced CSI computation may be reported. For example, the UE may compute CSI based on PDSCH Signal to Interference and Noise Ratio (SINR) or using a DL DM-RS.

As mentioned above, the Type 1 DL triggered CSI report may be based on measurements of CSI-RS and may include CSI-Interference Measurement (CSI-IM). Therefore, Type 1 DL triggered CSI report may take more time to generate than a Type 2 DL triggered CSI report that may be based on PDSCH. In the Type 2 CSI report, the computation/measurement at UE may be based on different signaling than CSI-RS and/or CSI-IM. Instead, the Type 2 CSI report may be based on PDSCH SINR and/or DL DM-RS. As the UE processes the PDSCH SINR and/or DL DM-RS without CSI reporting, the UE has the information and may reuse the measurements and computations to provide CSI information to the base station. Thus, the Type 2 DL triggered CSI report may involve less additional computation than a Type 1 DL triggered CSI report.

The minimum processing time for HARQ-ACK and CSI may be similar or may differ. In some aspects, new timelines for the reporting may be provided. The base station may indicate such a timeline to the UE as well as the resource allocation for the reporting. For example, in some aspects HARQ-ACK feedback and the CSI report may be fed back by the UE together and in other aspects, the HARQ-ACK feedback and the CSI reporting may be transmitted separately by the UE. Aspects presented herein provide resource allocation for different examples of reporting.

Figure 8:
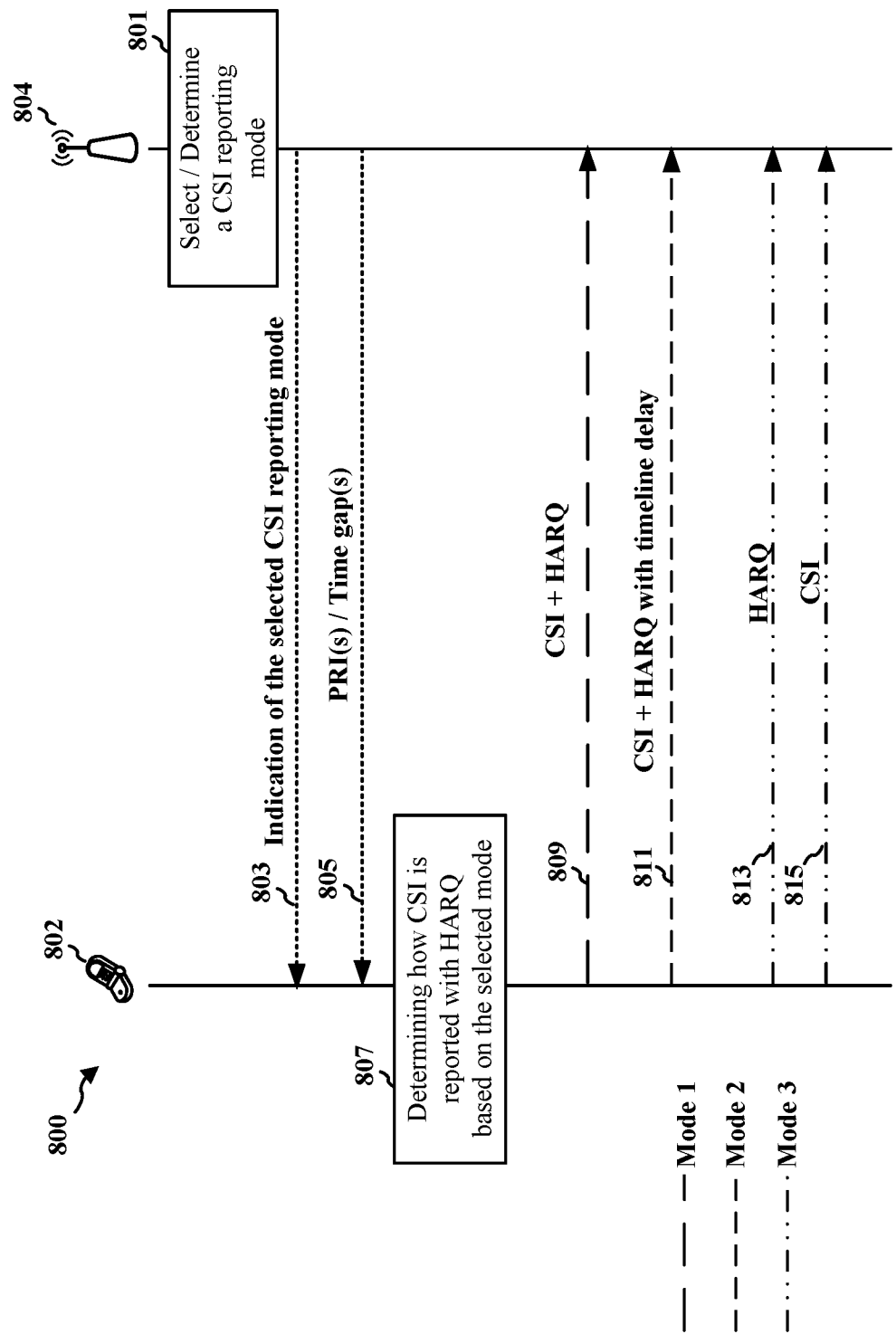
FIG. 8 is an example communication flow between a UE and a base station.

FIG. 8 illustrates an example communication flow 800 between a UE 802 and a base station 804 that includes the UE 802 receiving downlink communication(s) from the base station 804 that triggers a CSI report. The UE may determine whether to report CSI together with HARQ feedback and transmits the CSI and the HARQ feedback based on the determination.

As illustrated in FIG. 8, the base station 804 may select or determine a mode for CSI reporting, at 801, for the UE 802. The selection of mode may base on available modes defined at the base station 804, or may be based on various factors such as CSI computation timeline, HARQ feedback timeline and/or whether HARQ feedback can be delayed.

In some examples, at least three different modes of operations (i.e., CSI reporting modes) may be used by the UE 802 and the base station 804. The base station 804 may select one of the reporting modes and indicate the selected mode to the UE 802 for reporting CSI and HARQ-ACK.

In the first mode ("Mode 1"), the CSI and the HARQ-ACK may be reported together and may be reported with no timeline change (e.g., using a similar timeline as to HARQ-ACK feedback so that the HARQ-ACK feedback is not delayed). The HARQ-ACK feedback and the CSI information may be transmitted together in a same channel, for example.

In the second mode ("Mode 2"), the CSI and the HARQ-ACK feedback may be reported together, and the reporting time is delayed in comparison to the time at which HARQ-ACK may be sent. The HARQ-ACK feedback and the CSI information may be transmitted together in a same channel, for example. The Mode 2 reporting may be applied when the CSI computation involves a longer time than the HARQ-ACK determination. The HARQ-ACK is delayed so that it can be sent with the CSI when the CSI is determined. Thus, in Mode 1 and Mode 2, the UE may jointly send both the CSI and the HARQ-ACK feedback over a same channel yet using different timing for the two modes.

In the third mode ("Mode 3"), the CSI and the HARQ-ACK feedback may be reported separately, such as at different times and/or over different PUCCH resources. The third mode may be used when the base station 804 does not want the reporting of HARQ-ACK to be delayed. In each of the proposed modes above, the CSI and the HARQ-ACK may be triggered by a single DL DCI.

The Mode 1 CSI report (in which the CSI report and HARQ-ACK are reported together using the HARQ-ACK timing) may be enabled (i.e., indicated to UE) when a CSI computation timeline is similar to the same as HARQ-ACK. For example, the Mode 1 CSI report may be used when the CSI computation timeline is the same as HARQ-ACK timing, within a threshold amount of time as the HARQ-ACK timing, no more than the HARQ-ACK timing, etc. This can be the case for a Type 2 DL triggered CSI report in which the CSI is based on PDSCH or based on DL DM-RS rather than CSI-RS and involves a lighter computation burden for the UE. As well, the Type 2 DL triggered CSI report may be triggered implicitly (e.g., a reduced CSI report may be triggered based on a decoding failure). As the timeline for CSI reporting is similar to or the same as the HARQ-ACK reporting, the timeline of HARQ-ACK reporting may be used to transmit the combined information. For example, when CSI reporting is triggered because the PDSCH decoding has failed, the UE may report CQI or some indication of an amount of resources for following transmissions so that with the next transmission of the same TB, the PDSCH is more likely to be decoded successfully. For the Mode 1 reporting, the CSI computation timeline may be based on $N_1$ as shown in Tables 1 and 2. The Mode 1 Reporting may also be enabled for a Type 1 DL triggered report, triggered by a downlink signal from the base station, when the CSI computation load is less than those shown in Tables 3 and 4. As an example, the Mode 1 reporting can be used for a wideband CSI report with 1 or 2 CSI-RS ports in a single resource. In such examples, the load of the CSI measurement may be reduced according to condition(s) from the base station so that CSI computation can be finished at the same time as the HARQ-ACK reporting The Mode 2 reporting may be enabled (i.e., indicated to UE) when the CSI report and the HARQ-ACK feedback are transmitted together, but the time for the CSI computation is more than the time for HARQ-ACK reporting alone. For example, when a CSI computation delay (Z, Z'), e.g., chosen from Tables 3 and/or 4, is more than a time for the HARQ-ACK feedback (e.g., N1), the Mode 2 reporting may be applied. In the Mode 2 reporting, a separate (or a new) timeline for combined CSI and HARQ-ACK reporting may be used.

The Mode 3 reporting may be enabled (i.e., indicated to UE) in scenarios to avoid a delay the HARQ-ACK reporting, or if the base station will use CSI report for other transmissions and not necessarily the retransmission of the same TB. In such a case, the timeline for the HARQ-ACK and the CSI report may be the same as shown in Tables 1 to 4, and may follow two separate timelines. For example, the CSI report may be based on one timeline and the HARQ-ACK report may be based on a different timeline.

Referring again to FIG. 8, after the base station 804 selects or determines the CSI reporting mode, at 801, the base station 804 may transmit an indication 803 of the selected CSI reporting mode to the UE 802 in a downlink communication (e.g., DL grant or other downlink signaling). The indication may be explicit or may be an implicit indication of the selected reporting mode.

In one aspect, the indication 803 of the reporting mode may be indicated to the UE 802 explicitly in a DL signal from the base station. For example, the base station 804 may send the indication in an RRC message to the UE 802 indicating whether to report CSI for DL triggered HARQ-ACK based on Mode 1, 2 or 3, e.g., whether to report CSI together with HARQ-ACK information and/or indicating the timing to use for the transmission(s). The base station may indicate a mode to follow based on a type (e.g., Type 1 or 2) of the DL triggered CSI report. For example, for Type 2 DL triggered CSI report, the base station 804 may indicate for the UE 802 to use a first mode (such as Mode 1), and for Type 1 DL triggered CSI report, the base station 804 may indicate for the UE 802 to follow a different mode (such as Mode 2 or 3). The reporting mode may further be indicated explicitly to UE 802 in DCI. In some examples, the indication of the mode may be associated with RRC signaling for a CSI process ID. In some examples, the indication of the mode may be based on the MCS table used for scheduling PDSCH. In some examples, the indication of the mode may be based on whether the CSI report is triggered by the grant scheduling an initial transmission or a re-transmissions. In some examples, the indication of the mode may be based on number of layers that is used for PDSCH transmissions. In some examples, the indication of the mode may be based on a number of TBS for the PDSCH transmission. In some examples, the indication of the mode may be based on a number of RBs for the PDSCH transmission. In some examples, the indication of the mode may be based on whether sub-band CSI reporting or wideband CSI reporting is configured for the triggered CSI Report Configuration. The reporting mode may be based on one or more of these example parameters.

In another aspect, a type of reporting may be indicated to the UE 802 based on timing for the CSI and/or the HARQ-ACK feedback. For example the reporting mode may be indicated to the UE, or determined by the UE, based on time gap(s) (e.g., the time gap between DL DCI triggering the CSI report and the PUCCH resource carrying the CSI report). For example, if the gap between the PDCCH and PUCCH enables Type 2 DL triggered CSI reporting but not Type 1 DL triggered CSI reporting, then the UE 802 may follow the Type 2 reporting. Alternatively, if the gap is only sufficient for HARQ-ACK reporting, e.g., less than a threshold, then the UE may report the CSI separately or may not report the CSI. In other words, the timing may provide an implicit indication to the UE 802 about whether to perform Type 2 reporting, e.g., when sufficient time is provided for Type 2 reporting. Sufficient time may be time that is equal to or greater than a threshold However, if insufficient time, e.g., less than the threshold, is indicated to the UE 802 to perform Type 2 reporting, the UE 802 may report HARQ-ACK without the CSI. In addition, if the gap is larger than a threshold, then the timing may indicate to the UE 802 to provide a more robust CSI update. As an example, the DL grant may trigger CSI reporting for a given CSI Report Configuration. If the time gap to the PUCCH resource is less than a threshold, then the base station 804 may indicate implicitly to the UE 802 to either report a reduced CSI report or to report HARQ-ACK and CSI separately, e.g., at different times.

Referring again to FIG. 8, after the UE 802 receives the indication 803 of the selected mode from the base station 804, the UE 802 determines whether to report CSI together with HARQ feedback as illustrated at 807. Based on the determination, at 807, the UE 802 may transmit the CSI and the HARQ feedback together in a combined transmission 809 with no timeline change (e.g., based on Mode 1), together in a combined transmission 811 with a timeline delay for the HARQ-ACK feedback (e.g., Mode 2), or separately in HARQ-ACK transmission 813 and CSI transmission 815 (e.g., Mode 3).

The base station may indicate, and/or the UE may determine, the PUCCH resource(s) for reporting the HARQ-ACK feedback and the CSI in any of a number of ways.

In a first aspect, the base station 804 may indicate a single PUCCH Resource Indicator (PRI) and K1 (i.e., the time gap between the end of PDSCH to the beginning of PUCCH), at 805, to the UE 802. If a single PRI and K1 field are present in the DL DCI from the base station 804, the UE 802 may determine to transmit a Type 2 DL triggered CSI report. The UE may determine to use a Mode 1 or Mode 2 CSI report for providing the Type 2 DL triggered CSI report. Alternatively or additionally, the CSI triggering field in the DCI may trigger a Type 2 DL triggered CSI. In such examples, the UE 802 may transmits CSI and HARQ-ACK on the same resource indicated by the PRI and K1. This may be applicable to both Mode 1 and Mode 2 reporting where HARQ-ACK and CSI are configured to report together, e.g., for transmissions 809 or 811.

In a second aspect, the base station 804 may indicate a single PRI and K1, at 805, e.g., a single PRI and K1 field may be present in the DL DCI, but the CSI triggering event may be L1 based. For example, the UE 802 may be triggered to report the CSI based on a PDSCH decoding failure. In this example, the UE 802 may determine not to transmit CSI or may send more involved CSI report. If the CSI is not sent, the UE 802 may use the PRI and K1 indicated in the DCI to report HARQ-ACK. If the UE 802 determines to report CSI, the UE may apply a predetermined offset(s) to K1 or PRI or both to determine the resources for transmitting the CSI and HARQ-ACK. The UE 802 then sends CSI and HARQ-ACK on the inferred PUCCH resource, e.g., at 811.

In a third aspect, the base station 804 may indicate multiple PRI and/or K1 to the UE 802 in DCI, at 805. For example, the base station 804 may indicate two PRI and/or two K1 values to the UE 802. If the UE 802 receives multiple PRI and/or K1 fields, the UE may transmit the CSI reporting using one PRI and/or K1 and transmit the HARQ-ACK using another PRI and/or K1. If different PRI and/or K1 values indicate the same PUCCH resource(s), the CSI and the HARQ-ACK feedback may be sent together, e.g., at 809 or 811, on the PUCCH resources. If the different PRI and/or K1 indicate different PUCCH resource(s), the CSI and the HARQ-ACK feedback may be sent separately, e.g., at 813 and 815.

In a fourth aspect, the base station 804 may indicate in DCI, e.g., at 803, whether the HARQ-ACK and CSI may be sent together or separately. For example, if the base station 804 indicates two K1 and/or PRI to the UE, at 805, and the UE is indicated, e.g., at 803, to send HARQ-ACK and CSI separately, then the UE may use the two PRI and/or K1 values to send the HARQ-ACK and CSI separately, e.g., at 813 and 815. If the base station 804 indicates two K1 and/or PRI to the UE 802, at 805, and indicates to the UE 802 to send HARQ-ACK and CSI together, at 803, then the UE 802 may use one of the indicated K1(s) and PRI(s) to transmit HARQ-ACK and CSI together, e.g., at 809 or 811.

In another aspect, the base station 804 may provide an indication (e.g., through a bit in DCI) to the UE 802 indicating whether to send HARQ-ACK and CSI separately or jointly, and based on that indication (e.g., the one bit in DCI), the UE may send the combined transmission(s) using a K1 and PRI provided by the base station, at 805. If the base station 804 indicates one set of K1 and/or PRI to the UE 802 in the DCI and indicates for the UE to send HARQ-ACK and CSI together, the UE 802 may use the resource indicated by the PRI and K1 to transmit the combined transmission of the CSI and HARQ-ACK feedback, e.g., at 809 or 811. If the base station 804 indicates one set of K1 and/or PRI to the UE 802 and indicates for the UE to send the HARQ-ACK and CSI separately, the UE 802 may use the resources indicated by the K1 and/or PRI to determine transmit one message (e.g., such as the HARQ-ACK feedback at 813) and may determine second resources for the other transmission (e.g., the CSI at 815) based partly on the PRI and K1. For example, the UE 802 may apply and offset to the PRI and/or K1 to determine the resources for transmitting the other transmission.

In a fifth aspect, the base station may indicate whether HARQ-ACK and CSI may be sent together or separately in an implicit manner. For example, the base station 804 may indicate a first set of K1 and/or PRI fields in DCI to the UE, at 805. An additional K1 and/or PRI may be associated with the first K1 and PRI. For example, each codepoint may be associated with an additional K1/PRI. The UE 802 may use the first set of K1 and PRI to determine the associated additional K1/PRI. If the first PRI and K1 indicated in the DCI is the same as the associated additional PRI/K1, the UE 802 may transmit HARQ-ACK and CSI together, e.g., at 809 or 811. If the first PRI and K1 are different than the associated additional PRI/K1, the UE 802 may transmit the CSI and the HARQ-ACK feedback separately, e.g., at 813 and 815, using the first PRI and K1 for one transmission (e.g., the HARQ-ACK 813) and the additional PRI/K1 for the other transmission (e.g., the CSI 815).

Various aspects may be applied together. As one example, the second aspect and the four aspect may be applied together.

Figure 9:
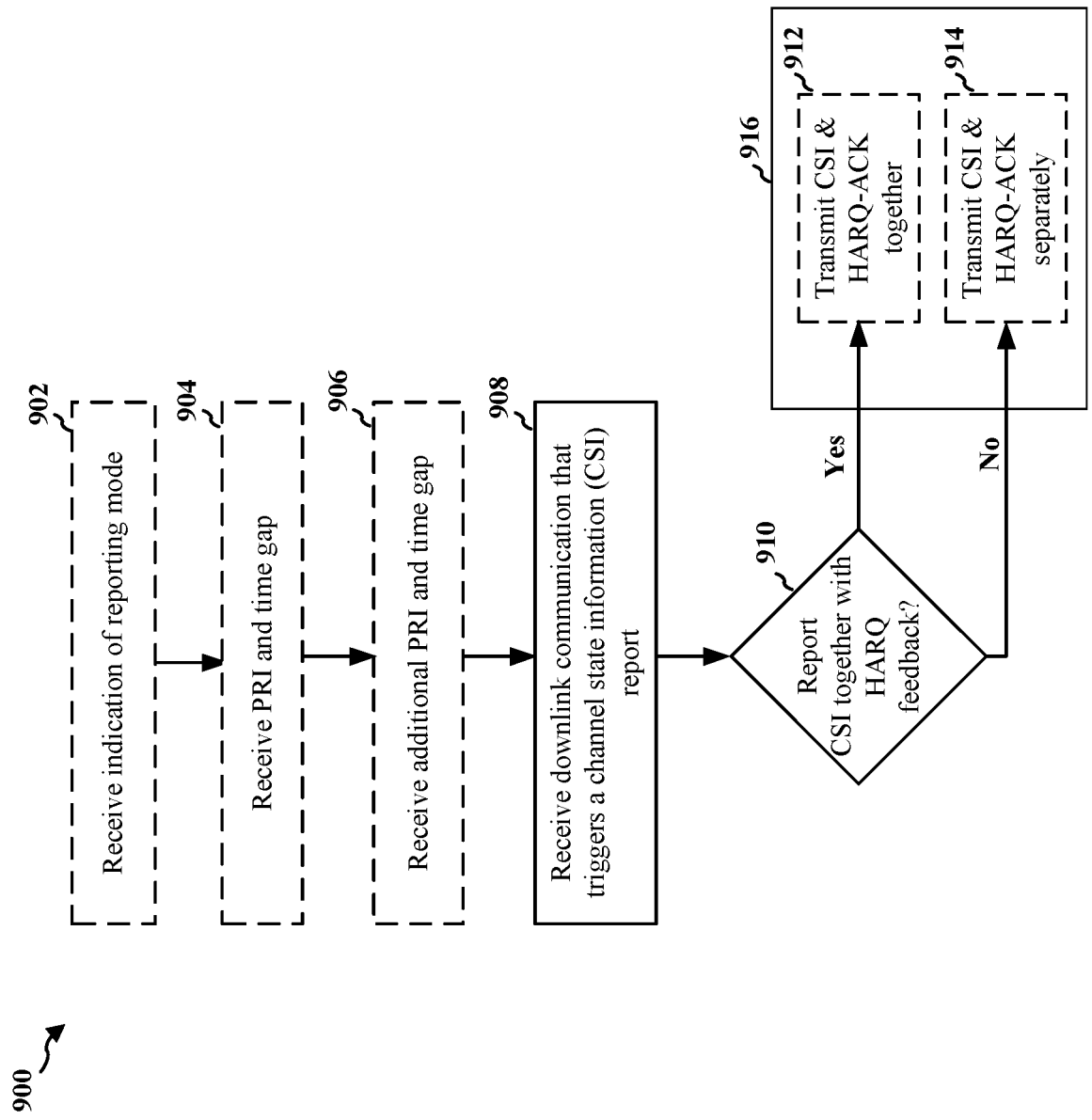
FIG. 9 is a flowchart of a method of wireless communication at a user equipment.

FIG. 9 is a flowchart of a method 900 of wireless communication. The method may be performed by a UE or a component of a UE (e.g., the UE 104, 350, 802; the apparatus 1002, 1002'; the processing system 1114, which may include the memory 360 and which may be the entire UE 350 or a component of the UE 350, such as the TX processor 368, the RX processor 356, and/or the controller/processor 359). Optional aspects are illustrated with a dashed line. The method may enable a UE to provide a CSI report to a base station in combination with HARQ-ACK feedback.

At 908, the UE receives downlink communication that triggers a CSI report. The reception may be performed, e.g., by the reception component 1004 of the apparatus 1002 in FIG. 10. The downlink communication may trigger the CSI report explicitly or implicitly. The downlink communication may include explicit signaling from the base station requesting a CSI report, e.g., such as described in connection with the Type 1 DL triggered CSI report. The downlink communication may include PDSCH, e.g., the UE may be triggered to provide a CSI report based on a decoding failure for the PDSCH.

At 910, the UE determines whether to report CSI together with HARQ feedback. The determination may be made based on any combination of the aspects described in connection with FIG. 8. For example, FIG. 8 illustrates an example determination at 807. The determination may be performed, e.g., by the determination component 1008 of the apparatus 1002 in FIG. 10.

After the UE determines whether to report the CSI together with the HARQ feedback, at 916, the UE transmits the CSI and the HARQ feedback based on the determination of whether to report the CSI together with the HARQ feedback. The transmission may be performed, e.g., by the transmission component 1006 of the apparatus 1002 in FIG. 10.

If UE determines to report CSI and HARQ feedback together, then at 912, the UE reports the CSI together with the HARQ feedback, e.g., as illustrated at 809 or 811. The UE may report the CSI and the HARQ feedback using a timing for the HARQ feedback. For example, the UE may determine to report the CSI together with the HARQ feedback using the timing for the HARQ feedback based on a relationship between a CSI computation time and the timing for the HARQ feedback. The UE may also determine to report the CSI together with the HARQ feedback using the timing for the HARQ feedback based on the CSI report being a reduced CSI report, where the reduced CSI report may be determined based on one or more of a PDSCH or a DM-RS. The reduced CSI report may comprise a wideband CSI report with no more than two CSI-RS ports in a single resource. When the timing for the CSI feedback is greater than the HARQ feedback, the UE may report the CSI and the HARQ feedback using a timing for the CSI feedback. In other words, the reporting of HARQ may be delayed so that CSI and HARQ may be reported together based on CSI feedback's timing.

If UE determines to report CSI and HARQ feedback separately, then at 914, the UE may report the CSI using different control channel resources and/or time resources than the HARQ feedback. FIG. 8 illustrates an example of the HARQ feedback 813 being transmitted separately from the CSI 815.

At 902, the reporting mode may be indicated to the UE explicitly, such as in a DL grant or other downlink signaling from the base station. For example, the UE may receive an indication (e.g., such as indication 803 in FIG. 8) of a reporting mode from the base station, where the UE determines whether to report the CSI together with the HARQ feedback based on the indication of the reporting mode. The reception of the indication may be performed, e.g., by the reception component 1004 and/or the report mode component 1010 of the apparatus 1002 in FIG. 10. The indication may be received in RRC signaling or DCI. The indication may also base on at least one of: a type of a downlink triggered CSI report, a CSI process identifier (ID), a modulation and coding scheme used for scheduling a physical downlink shared channel (PDSCH), the CSI being triggered by a first grant scheduling an initial transmission, the CSI being triggered by a second grant scheduling a retransmission, a first number of layers for a PDSCH transmission, a second number of transport blocks for the PDSCH transmission, a third number of resource blocks for the PDSCH transmission, sub-band CSI reporting being configured for the UE, or wideband CSI reporting being configured for the UE.

The reporting mode may be indicated to the UE implicitly, e.g., as described in connection with FIG. 8. The UE may determine whether to report the CSI together with the HARQ feedback based on an amount of time between the downlink communication that triggers the CSI report and an uplink control channel resource for transmission of the CSI report. For example, the UE may report a reduced CSI report together with the HARQ feedback when the amount of time is less than a first threshold, or where the UE reports the CSI using different control channel resources than the HARQ feedback when the amount of time is less than a second threshold. The UE may also report a configured CSI report together with the HARQ feedback when the amount of time is more than the first threshold.

There are various ways to determine the PUCCH resource for reporting HARQ feedback and CSI feedback together. In one aspect, the UE may receive a PRI and a time gap (e.g., K1) between a PDSCH and the HARQ feedback, where the UE transmits the CSI together with the HARQ feedback using resources indicated by the PRI and the time gap.

In another aspect, the UE may receive, e.g., at 904, a PRI and a time gap between a PDSCH transmission and the HARQ feedback in DCI, where the CSI report is triggered by unsuccessful decoding of the PDSCH transmission, and where the UE transmits the HARQ feedback using resources indicated by the PRI and the time gap. The PRI and time gap may be received, e.g., by the reception component 1004 and/or the PRI/K1 component 1012 of the apparatus 1002 in FIG. 10. The UE may transmit the CSI report using an offset applied to the resources indicated by one or more of the PRI and the time gap.

In another aspect, the UE may receive, in the DCI, at least one of an additional PRI or an additional time gap, wherein the UE transmits the CSI report using additional resources indicated by the at least one of the additional PRI or the additional time gap.

In another aspect, the UE may receive an indication of a reporting mode from the base station, at 902, where the UE may determine whether to report the CSI together with the HARQ feedback based on the indication of the reporting mode, and then the UE receives, in DCI, at least one PRI and at least one time gap, at 904, where the UE may transmit the CSI and the HARQ feedback based on the indication of the reporting mode, the at least one PRI and the at least one time gap. For example, the indication, at 902, may indicate to transmit the CSI together with the HARQ feedback and the DCI indicates one PRI and one time gap, at 904, and the UE transmits the CSI and the HARQ feedback using the one PRI and the one time gap. The indication, at 902, may indicate to transmit the CSI separately from the HARQ feedback and the DCI may indicate a PRI and a time gap, at 904, and the UE may transmit the HARQ feedback using the PRI and the time gap and may transmit the CSI using an offset applied to at least one of the PRI and the time gap.

Multiple PRI and time gap(s) may also be used to trigger the CSI reporting implicitly. For example, at 906, the indication may indicate to transmit the CSI separately from the HARQ feedback and the DCI may indicate a first PRI and a first time gap and at least one of a second PRI or a second time gap, where the UE transmits the HARQ feedback using the first PRI and the first time gap and transmits the CSI report using the at least one of the second PRI or the second time gap. The additional PRI and/or time gap may be received, e.g., by the reception component and/or the PRI/K1 component 1012 of the apparatus 1002 in FIG. 10. The indication may indicate to transmit the CSI together with the HARQ feedback and the DCI may indicate multiple PRIs or multiple time gaps, and wherein the UE transmits the CSI and the HARQ feedback using one of the multiple PRIs or one of the multiple time gaps.

In another aspect, the UE may receive, in DCI, a first PRI and a first time gap, wherein a codepoint of the DCI is associated with a second PRI and a second time gap, where the UE may transmits the CSI report together with the HARQ feedback if the first PRI matches the second PRI and the first time gap matches the second time gap. The UE may transmit the HARQ feedback using the first PRI and the first time gap and transmit the CSI report using the second PRI and the second time gap if the first PRI is different than the second PRI or if the first time gap is different than the second time gap.

Figure 10:
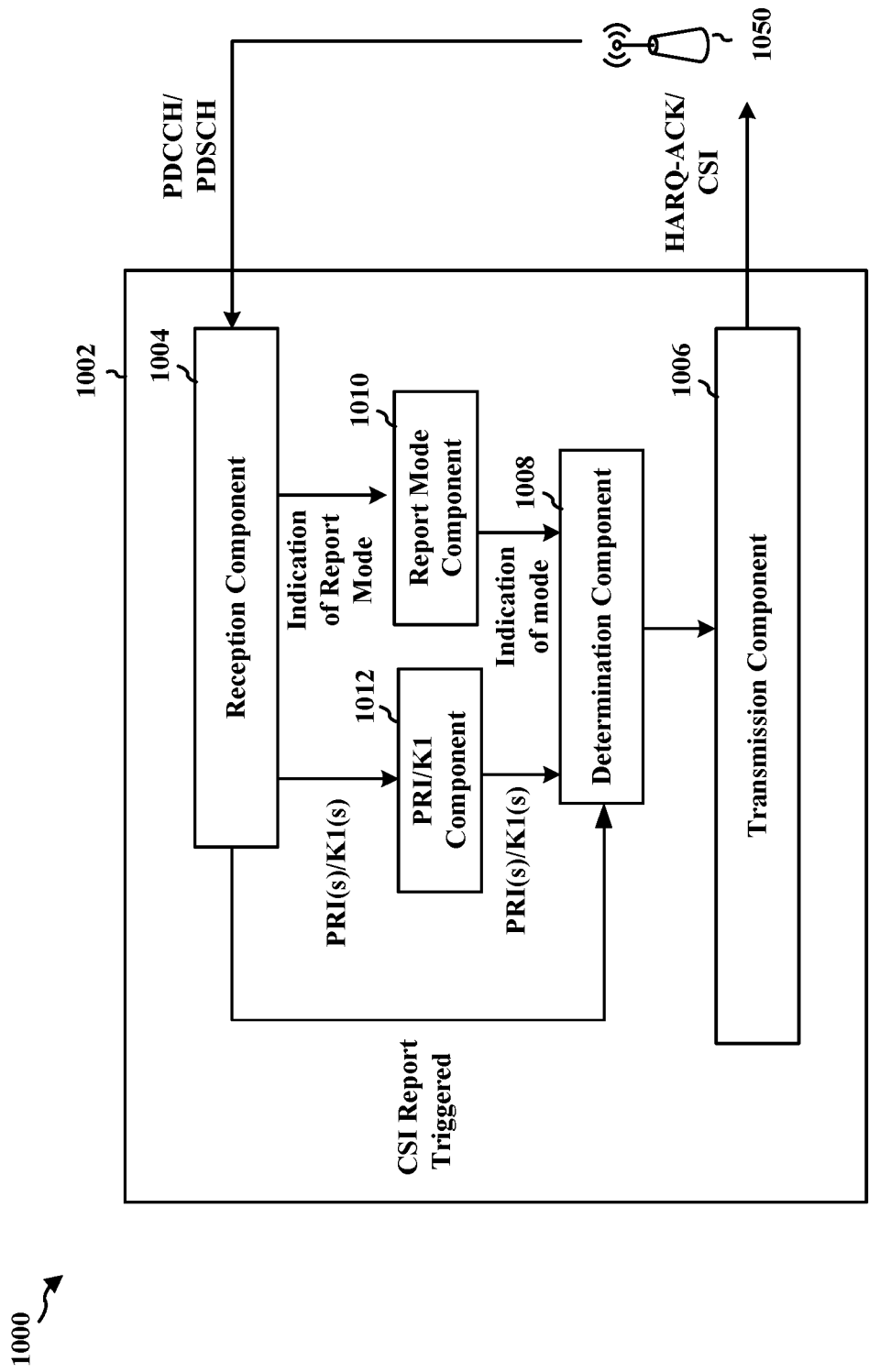
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. The apparatus includes a reception component 1004 configured to receive downlink communication from the base station 1050 that triggers a CSI report, e.g., as described in connection with 908 in FIG. 9. The apparatus includes a determination component 1008 configured to determine whether to report CSI together with HARQ feedback, e.g., as described in connection with 910 in FIG. 9. The apparatus includes a transmission component 1006 configured to transmit the CSI and the HARQ feedback based on the determining whether to report the CSI together with the HARQ feedback, e.g., as described in connection with 916 in FIG. 9. The apparatus includes a report mode component 1010 configured to receive an indication of a reporting mode from a base station, e.g., as described in connection with 902 in FIG. 9, where the UE determines whether to report the CSI together with the HARQ feedback based on the indication of the reporting mode. The apparatus includes a PRI/K1 component 1012 configured to receive at least one PRI and at least one time gap, e.g., as described in connection with 904 and/or 906 in FIG. 9, where the UE transmits the CSI together with the HARQ feedback using the PRI(s) and the time gap(s.

The apparatus may include additional components that perform each of the blocks of the algorithm in the aforementioned flowchart of FIG. 9 and aspects performed by the UE 802 in FIG. 8. As such, each block in the aforementioned flowchart of FIG. 9 and aspects performed by the UE 802 in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
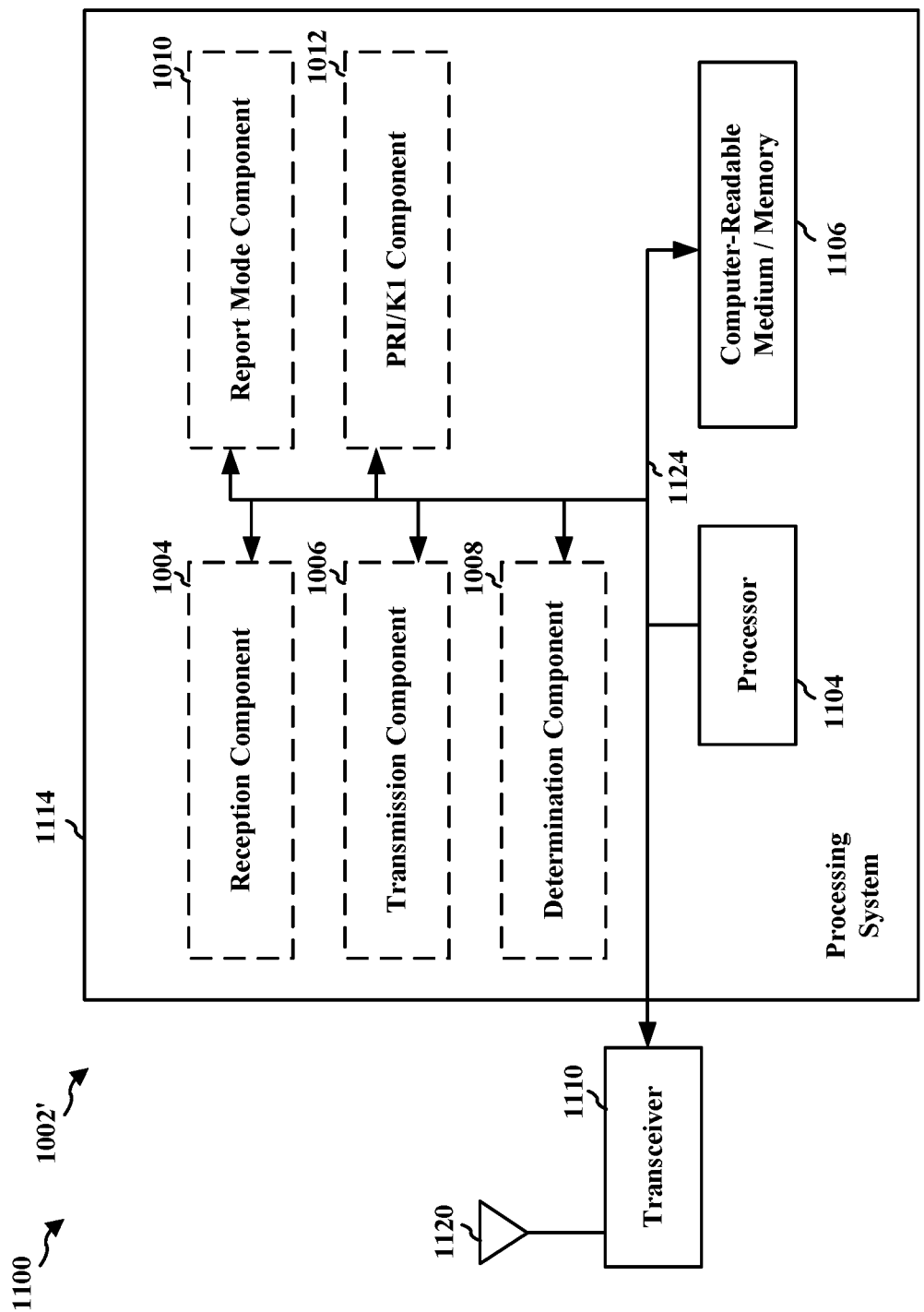
FIG. 11 is a diagram illustrating an example of a hardware implementation for an apparatus employing a processing system

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving downlink communication that triggers a CSI report; means for determining whether to report CSI together with HARQ feedback; and means for transmitting the CSI and the HARQ feedback based on the determining whether to report the CSI together with the HARQ feedback. The apparatus may further include means for receiving an indication of a reporting mode from a base station, wherein the UE determines whether to report the CSI together with the HARQ feedback based on the indication of the reporting mode. The apparatus may further include means for receiving a PRI and a time gap between a physical downlink shared channel transmission and the HARQ feedback, wherein the UE transmits the CSI together with the HARQ feedback using resources indicated by the PRI and the time gap. The apparatus may further include means for receiving, in DCI, a PRI and a time gap between a PDSCH transmission and the HARQ feedback in downlink, wherein the CSI report is triggered by unsuccessful decoding of the PDSCH transmission, and wherein the UE transmits the HARQ feedback using resources indicated by the PRI and the time gap. The apparatus may further include means for receiving, in the DCI, at least one of an additional PRI or an additional time gap, wherein the UE transmits the CSI report using additional resources indicated by the at least one of the additional PRI or the additional time gap. The apparatus may further include means for receiving an indication of a reporting mode from a base station, where the UE determines whether to report the CSI together with the HARQ feedback based on the indication of the reporting mode; and means for receiving, in DCI, at least one PRI and at least one time gap, wherein the UE transmits the CSI and the HARQ feedback based on the indication of the reporting mode, the at least one PRI and the at least one time gap. The apparatus may further include means for receiving, in DCI, a first PRI and a first time gap, wherein a codepoint of the DCI is associated with a second PRI and a second time gap, and where the UE transmits the CSI report together with the HARQ feedback if the first PRI matches the second PRI and the first time gap matches the second time gap. The aforementioned means may be one or more of the aforementioned components of the apparatus 1002/1002' and/or the processing system 1114 of the apparatus 1002' may be configured to perform the functions recited by the aforementioned means. The processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
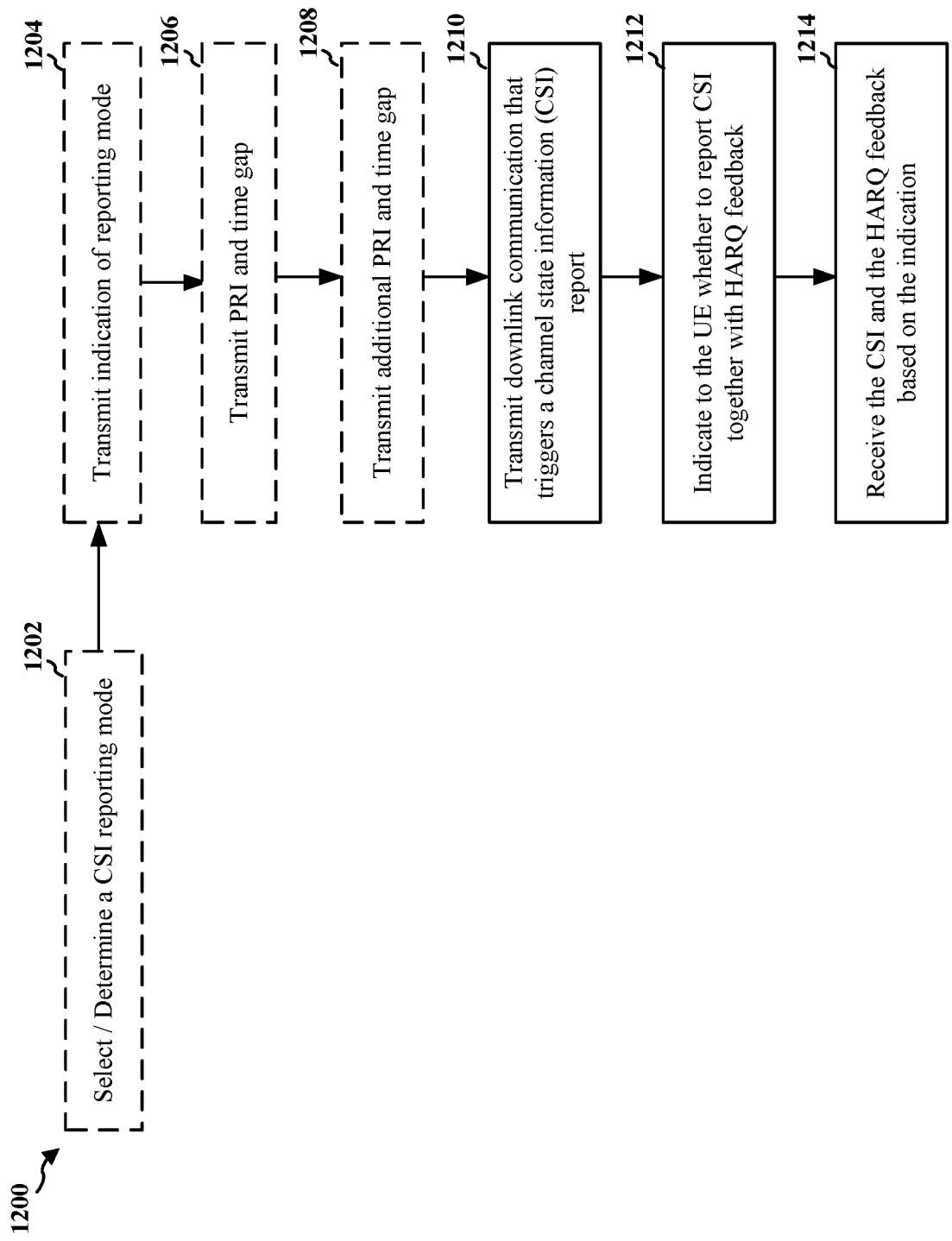
FIG. 12 is a flowchart of a method of wireless communication at a base station.

FIG. 12 is a flowchart of a method 1200 of wireless communication. The method may be performed by a base station or a component of a base station (e.g., the base station 102, 180, 310, 804; the apparatus 1302, 1302; the processing system 1414, which may include the memory 376 and which may be the entire base station 310 or a component of the base station 310, such as the TX processor 316, the RX processor 370, and/or the controller/processor 375). Optional aspects are illustrated with a dashed line. The method may enable the base station to receive CSI reports in combination with HARQ-ACK feedback from a UE.

At 1210, the base station transmits downlink communication that triggers a CSI report. The downlink communication may trigger the CSI report explicitly or implicitly. The downlink communication may include explicit signaling from the base station requesting a CSI report, e.g., such as described in connection with the Type 1 DL triggered CSI report. The downlink communication may include PDSCH, e.g., the UE may be triggered to provide a CSI report based on a decoding failure for the PDSCH. The downlink communication may be transmitted, e.g., by the transmission component 1406 of the apparatus 1402 in FIG. 14.

At 1212, the base station indicates to the UE whether to report CSI together with HARQ feedback based on the base station's selection or determination of the mode for CSI reporting at 1002. Example aspects of an indication 803 are described in connection with FIG. 8. The indication may be performed, e.g., by the report mode component 1410 of the apparatus 1402 in FIG. 14.

Figure 13:
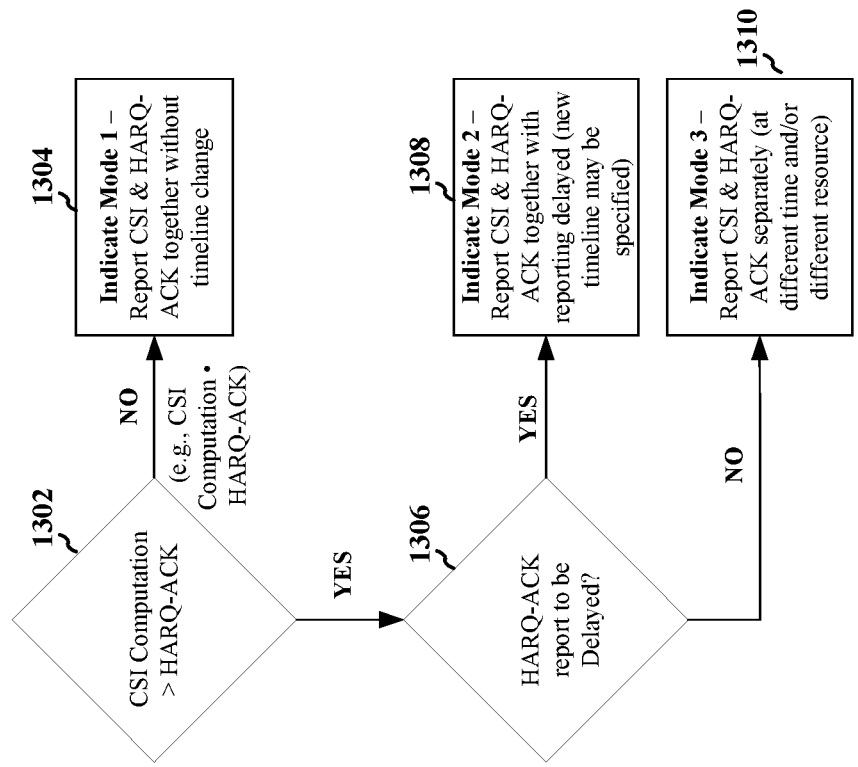
FIG. 13 is a diagram illustrating an example of CSI reporting mode determination.

At 1202, the base station may determine a mode for CSI reporting. The determination may be performed, e.g., by the determination component 1408 of the apparatus 1402 in FIG. 14. The determination of the mode may be determined, e.g., as described in connection with FIG. 8. FIG. 13 shows a diagram illustrating an example of CSI reporting mode determination. The determination may be based on various factors such as CSI computation timeline, HARQ feedback timeline and/or whether HARQ feedback is permitted to be delayed, e.g., as described in connection with FIG. 8. For example, if the CSI computation time is equal or less than HARQ feedback time, as determined at 1302, then the base station may determine for the report CSI to be reported together with HARQ feedback without any change in timeline (e.g., based on HARQ feedback's timeline), which may be indicated to the UE at 1304. If the CSI computation time is greater than HARQ feedback time, then the base station may determine, at 1306, whether to delay the HARQ feedback, and indicate, at 1308 for the CSI to be reported together with HARQ feedback based on a new specified timeline (e.g., based on CSI's timeline). In order for the HARQ feedback to not be delayed, the base station may indicate to the UE, at 1310, to report CSI and HARQ feedback separately.

After the base station indicates whether to report CSI together with HARQ feedback, at 1214, the base station receives the CSI and the HARQ feedback based on the indication, e.g., as described in connection with 809, 811, 813, and/or 815 in FIG. 8. The reception may be performed, e.g., by the reception component 1404 of the apparatus 1402 in FIG. 14. If base station indicates to report CSI and HARQ feedback together, then at 1214, the base station may receive the CSI together with the HARQ feedback. The base station may receive the CSI and the HARQ feedback using a timing for the HARQ feedback. For example, the base station may receive the CSI together with the HARQ feedback using the timing for the HARQ feedback based on a relationship between a CSI computation time and the timing for the HARQ feedback. The base station may receive the CSI together with the HARQ feedback using the timing for the HARQ feedback based on the CSI report being a reduced CSI report, where the reduced CSI report may be determined based on one or more of a PDSCH or a DM-RS. The reduced CSI report may comprise a wideband CSI report with no more than two CSI-RS ports in a single resource.

When the timing for the CSI feedback is greater than the HARQ feedback, the base station may receive the CSI and the HARQ feedback using a timing for the CSI feedback. In other words, the reporting of HARQ may be delayed so that CSI and HARQ may be reported together based on CSI feedback's timing. If base station receives CSI and HARQ feedback separately, then at 1214, the base station may receive the CSI from different control channel resources than the HARQ feedback.

At 1204, the base station may indicate the reporting mode explicitly, such as via a DL grant. For example, the base station may transmit an indication of a reporting mode to the UE, where the UE determines whether to report the CSI together with the HARQ feedback based on the indication of the reporting mode. The indication may be transmitted in RRC signaling or DCI. The indication may also base on at least one of: a type of a downlink triggered CSI report, a CSI process identifier (ID), a modulation and coding scheme used for scheduling a PDSCH, the CSI being triggered by a first grant scheduling an initial transmission, the CSI being triggered by a second grant scheduling a retransmission, a first number of layers for a PDSCH transmission, a second number of transport blocks for the PDSCH transmission, a third number of resource blocks for the PDSCH transmission, sub-band CSI reporting being configured for the UE, or wideband CSI reporting being configured for the UE.

The base station may indicate the reporting mode implicitly. The base station may determine whether to report the CSI together with the HARQ feedback based on an amount of time between the downlink communication that triggers the CSI report and an uplink control channel resource for transmission of the CSI report. For example, the base station may receive a reduced CSI report together with the HARQ feedback when the amount of time is less than a first threshold, or where the base station receives the CSI from different control channel resources than the HARQ feedback when the amount of time is less than a second threshold. The base station may also receive a configured CSI report together with the HARQ feedback when the amount of time is more than the first threshold.

There are various ways to indicate PUCCH resource for reporting HARQ feedback and CSI feedback together. In one aspect, the base station may transmit, at 1206, an indication a PRI and a time gap (e.g., K1) between a PDSCH and the HARQ feedback, where the base station receives the CSI together with the HARQ feedback using resources indicated by the PRI and the time gap. The transmission may be performed, e.g., by the transmission component 1406 and/or the PRI/K1 component 1412 of the apparatus 1402 in FIG. 14.

In another aspect, the base station may transmit, in DCI, a PRI and a time gap between a PDSCH transmission and the HARQ feedback in downlink, wherein the CSI report is triggered by unsuccessful decoding of the PDSCH transmission, and wherein the base station receives the HARQ feedback using resources indicated by the PRI and the time gap. The base station may receive the CSI report using an offset applied to the resources indicated by one or more of the PRI and the time gap.

In another aspect, the base station may transmit, in the DCI, at least one of an additional PRI or an additional time gap, wherein the base station receives the CSI report using additional resources indicated by the at least one of the additional PRI or the additional time gap.

In another aspect, the base station may transmit an indication of a reporting mode to the UE, where the UE may determine whether to report the CSI together with the HARQ feedback based on the indication of the reporting mode, and then the base station transmits, in DCI, at least one PRI and at least one time gap, where the base station may receive the CSI and the HARQ feedback based on the indication of the reporting mode, the at least one PRI and the at least one time gap. The indication may also indicate to receive the CSI together with the HARQ feedback and the DCI indicates one PRI and one time gap, and where the base station receives the CSI and the HARQ feedback using the one PRI and the one time gap. The indication may indicate to receive the CSI separately from the HARQ feedback and the DCI may indicate a PRI and a time gap, where the base station may receive the HARQ feedback using the PRI and the time gap and may receive the CSI using an offset applied to at least one of the PRI and the time gap.

Multiple PRI and time gap(s) may also be used to trigger the CSI reporting implicitly. For example, at 1208, the indication may indicate to receive the CSI separately from the HARQ feedback and the DCI may indicate a first PRI and a first time gap and at least one of a second PRI or a second time gap, where the base station receives the HARQ feedback using the first PRI and the first time gap and transmits the CSI report using the at least one of the second PRI or the second time gap. The indication may indicate to receive the CSI together with the HARQ feedback and the DCI may indicate multiple PRIs or multiple time gaps, where the base station may receive the CSI and the HARQ feedback using one of the multiple PRIs or one of the multiple time gaps.

In another aspect, the base station may transmit, in DCI, a first PRI and a first time gap, wherein a codepoint of the DCI is associated with a second PRI and a second time gap, where the base station may receive the CSI report together with the HARQ feedback if the first PRI matches the second PRI and the first time gap matches the second time gap. The base station may receive the HARQ feedback using the first PRI and the first time gap and receive the CSI report using the second PRI and the second time gap if the first PRI is different than the second PRI or if the first time gap is different than the second time gap.

Figure 14:
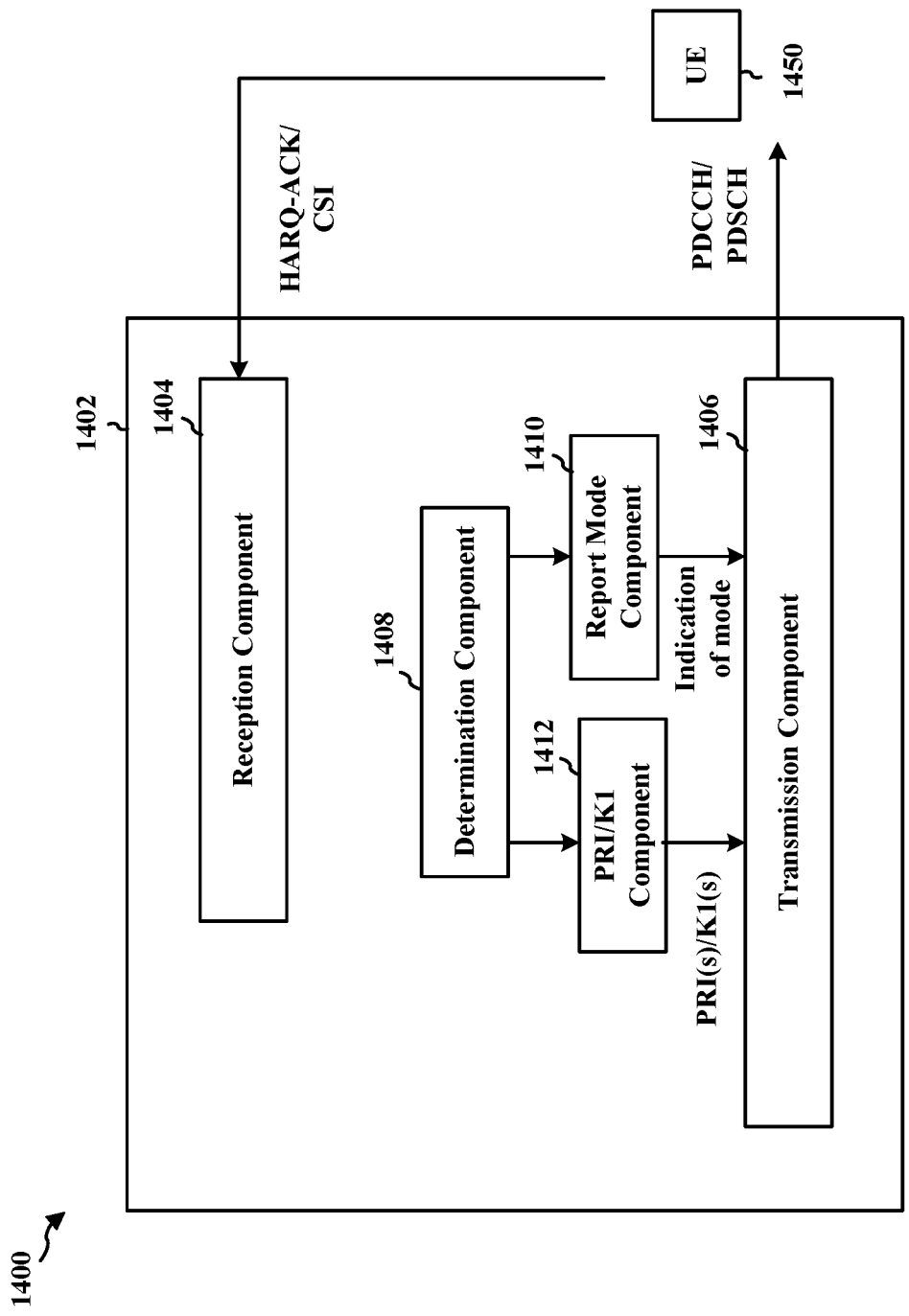
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a base station or a component of a base station. The apparatus includes a transmission component 1406 configured to transmit downlink communication that triggers a CSI report, e.g., as described in connection with 1210 in FIG. 12. The apparatus includes a report mode component 1410 configured to indicate to the UE 1450 whether to report CSI together with HARQ feedback, e.g., as described in connection with 1212 in FIG. 12. The apparatus includes a reception component 1404 configured to receive the CSI and the HARQ feedback based on the indication, e.g., as described in connection with 1214 in FIG. 12. The apparatus includes a PRI/K1 component 1412 configured to transmit at least one PRI and at least one time gap to the UE, e.g., as described in connection with 1206 and/or 1208 in FIG. 12. The apparatus may include a selection component 1408 configured to select a report mode for the UE, e.g., as described in connection with 1202 and/or FIG. 13.

The apparatus may include additional components that perform each of the blocks of the algorithm in the aforementioned flowchart of FIG. 12 and aspects performed by the base station 804 in FIG. 8. As such, each block in the aforementioned flowchart of FIG. 12 and aspects performed by the base station 804 in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
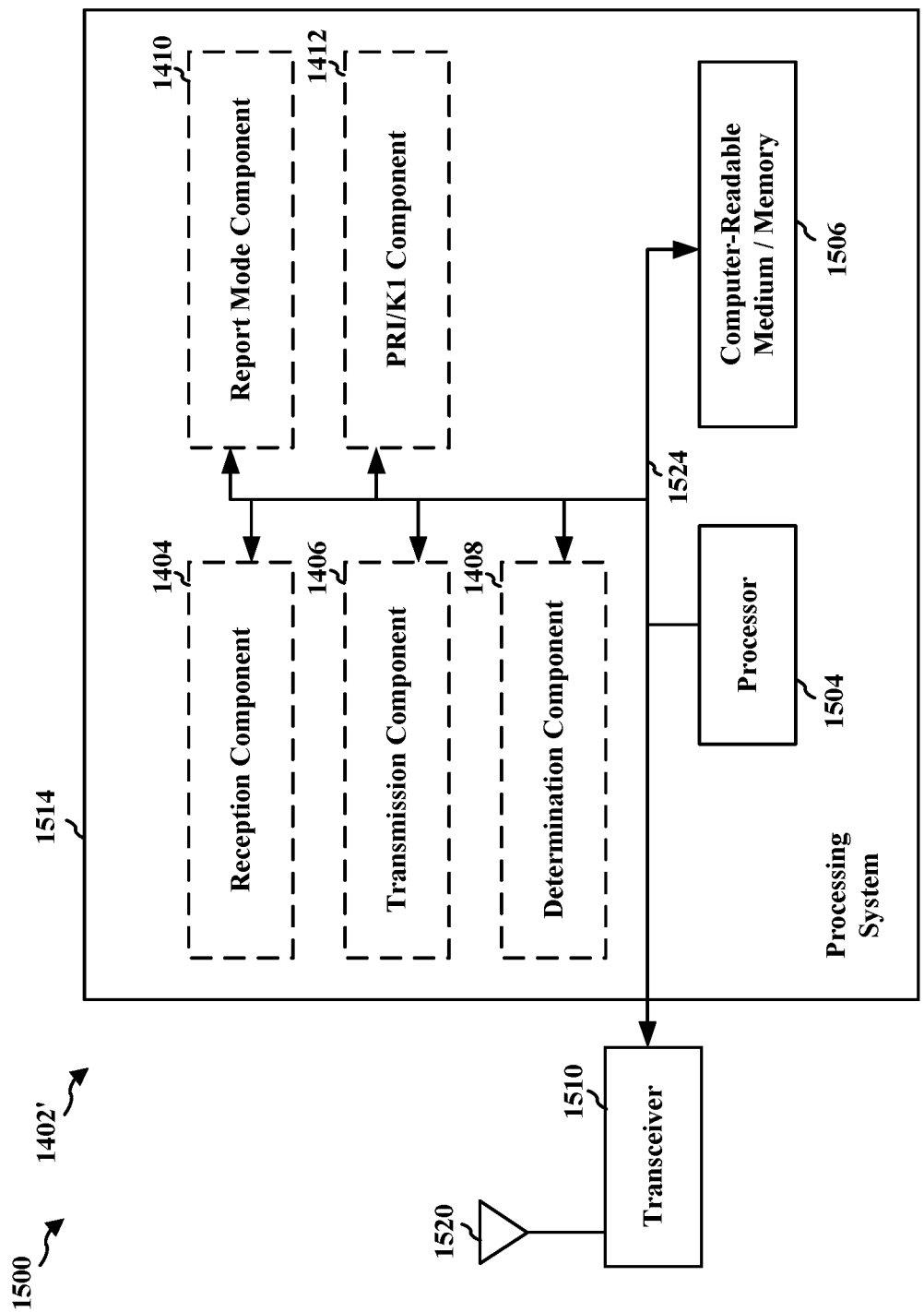
FIG. 15 is a diagram illustrating an example of a hardware implementation for an apparatus employing a processing system

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, an apparatus 1402/1402' for wireless communication at a base station may include means for transmitting downlink communication that triggers a CSI report, means for indicating to the UE whether to report CSI together with HARQ feedback, and means for receiving the CSI and the HARQ feedback based on the indication. The apparatus may further include means for transmitting a PRI and a time gap between a physical downlink shared channel transmission and the HARQ feedback, wherein the base station receives the CSI together with the HARQ feedback using resources indicated by the PRI and the time gap. The apparatus may further include means for transmitting, in DCI, a PRI and a time gap between a PDSCH transmission and the HARQ feedback in downlink, wherein the CSI report is triggered by unsuccessful decoding of the PDSCH transmission, and wherein the base station receives the HARQ feedback using resources indicated by the PRI and the time gap. The apparatus may further include means for transmitting, in the DCI, at least one of an additional PRI or an additional time gap, wherein the base station receives the CSI report using additional resources indicated by the at least one of the additional PRI or the additional time gap. The apparatus may further include means for transmitting, in DCI, at least one PRI and at least one time gap, wherein the base station receives the CSI and the HARQ feedback based on the indication of the reporting mode, the at least one PRI and the at least one time gap. The apparatus may further include means for transmitting, in DCI, a first PRI and a first time gap, wherein a codepoint of the DCI is associated with a second PRI and a second time gap, and wherein the base station receives the CSI report together with the HARQ feedback if the first PRI matches the second PRI and the first time gap matches the second time gap. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other embodiments or teaching described herein, without limitation.

Example 1 is method of wireless communication at a user equipment (UE), comprising: receiving downlink communication that triggers a channel state information (CSI) report; determining whether to report CSI together with hybrid automatic repeat request (HARQ) feedback; and transmitting the CSI and the HARQ feedback based on the determining whether to report the CSI together with the HARQ feedback.

In Example 2, the method of Example 1 further includes that the UE reports the CSI together with the HARQ feedback.

In Example 3, the method of Example 1 or Example 2 further includes that the UE reports the CSI and the HARQ feedback using a timing for the HARQ feedback.

In Example 4, the method of any of Examples 1-3 further includes that the UE determines to report the CSI together with the HARQ feedback using the timing for the HARQ feedback based on a relationship between a CSI computation time and the timing for the HARQ feedback.

In Example 5, the method of any of Examples 1-4 further includes that the UE determines to report the CSI together with the HARQ feedback using the timing for the HARQ feedback based on the CSI report being a reduced CSI report.

In Example 6, the method of any of Examples 1-5 further includes that the reduced CSI report is determined based on one or more of a physical downlink shared channel (PDSCH) or a downlink demodulation reference signal (DM-RS).

In Example 7, the method of any of Examples 1-6 further includes that the reduced CSI report comprises a wideband CSI report with no more than two channel state information reference signal (CSI-RS) ports in a single resource.

In Example 8, the method of any of Examples 1-7 further includes that the UE reports the CSI and the HARQ feedback using a timing for the CSI feedback.

In Example 9, the method of any of Examples 1-8 further includes that the UE determines to report the CSI together with the HARQ feedback using the timing for the CSI based on the timing for the CSI being greater than a HARQ feedback timing.

In Example 10, the method of any of Examples 1-9 further includes that the timing for the CSI feedback comprises a timeline for reporting the CSI together with the HARQ feedback.

In Example 11, the method of any of Examples 1-10 further includes that the UE reports the CSI using different control channel resources than the HARQ feedback.

In Example 12, the method of any of Examples 1-11, further comprising: receiving an indication of a reporting mode from a base station, wherein the UE determines whether to report the CSI together with the HARQ feedback based on the indication of the reporting mode.

In Example 13, the method of any of Examples 1-12 further includes that the indication is received in radio resource control (RRC) signaling.

In Example 14, the method of any of Examples 1-13 further includes that the indication is based on at least one of: a type of a downlink triggered CSI report, a CSI process identifier (ID), a modulation and coding scheme used for scheduling a physical downlink shared channel (PDSCH), the CSI being triggered by a first grant scheduling an initial transmission, the CSI being triggered by a second grant scheduling a retransmission, a first number of layers for a PDSCH transmission, a second number of transport blocks for the PDSCH transmission, a third number of resource blocks for the PDSCH transmission, sub-band CSI reporting being configured for the UE, or wideband CSI reporting being configured for the UE.

In Example 15, the method of any of Examples 1-14 further includes that the indication is received in downlink control information (DCI).

In Example 16, the method of any of Examples 1-15 further includes that the UE determines whether to report the CSI together with the HARQ feedback based on an amount of time between the downlink communication that triggers the CSI report and an uplink control channel resource for transmission of the CSI report.

In Example 17, the method of any of Examples 1-16 further includes that the UE reports a reduced CSI report together with the HARQ feedback when the amount of time is less than a first threshold, or wherein the UE reports the CSI using different control channel resources than the HARQ feedback when the amount of time is less than a second threshold.

In Example 18, the method of any of Examples 1-17 further includes that the UE reports a configured CSI report together with the HARQ feedback when the amount of time is more than the first threshold.

In Example 19, the method of any of Examples 1-18, further comprising: receiving a physical uplink control channel resource indication (PRI) and a time gap between a physical downlink shared channel transmission and the HARQ feedback, wherein the UE transmits the CSI together with the HARQ feedback using resources indicated by the PRI and the time gap.

In Example 20, the method of any of Examples 1-19, further comprising: receiving, in downlink control information (DCI), a physical uplink control channel resource indication (PRI) and a time gap between a physical downlink shared channel (PDSCH) transmission and the HARQ feedback in downlink, wherein the CSI report is triggered by unsuccessful decoding of the PDSCH transmission, and wherein the UE transmits the HARQ feedback using resources indicated by the PRI and the time gap.

In Example 21, the method of any of Examples 1-20 further includes that the UE transmits the CSI report using an offset applied to the resources indicated by one or more of the PRI and the time gap.

In Example 22, the method of any of Examples 1-21, further comprising: receiving, in the DCI, at least one of an additional PRI or an additional time gap further includes that the UE transmits the CSI report using additional resources indicated by the at least one of the additional PRI or the additional time gap.

In Example 23, the method of any of Examples 1-22, further comprising: receiving an indication of a reporting mode from a base station, wherein the UE determines whether to report the CSI together with the HARQ feedback based on the indication of the reporting mode; and receiving, in downlink control information (DCI), at least one physical uplink control channel resource indication (PRI) and at least one time gap, wherein the UE transmits the CSI and the HARQ feedback based on the indication of the reporting mode, the at least one PRI and the at least one time gap.

In Example 24, the method of any of Examples 1-23 further includes that the indication indicates to transmit the CSI separately from the HARQ feedback and the DCI indicates a first PRI and a first time gap and at least one of a second PRI or a second time gap, and wherein the UE transmits the HARQ feedback using the first PRI and the first time gap and transmits the CSI report using the at least one of the second PRI or the second time gap.

In Example 25, the method of any of Examples 1-24 further includes that the indication indicates to transmit the CSI together with the HARQ feedback and the DCI indicates multiple PRIs or multiple time gaps, and wherein the UE transmits the CSI and the HARQ feedback using one of the multiple PRIs or one of the multiple time gaps.

In Example 26, the method of any of Examples 1-25 further includes that the indication indicates to transmit the CSI together with the HARQ feedback and the DCI indicates one PRI and one time gap, and wherein the UE transmits the CSI and the HARQ feedback using the one PRI and the one time gap.

In Example 27, the method of any of Examples 1-26 further includes that the indication indicates to transmit the CSI separately from the HARQ feedback and the DCI indicates a PRI and a time gap, and wherein the UE transmits the HARQ feedback using the PRI and the time gap and transmits the CSI using an offset applied to at least one of the PRI and the time gap.

In Example 28, the method of any of Examples 1-27, further comprising: receiving, in downlink control information (DCI), a first physical uplink control channel resource indication (PRI) and a first time gap, wherein a codepoint of the DCI is associated with a second PRI and a second time gap, and wherein the UE transmits the CSI report together with the HARQ feedback if the first PRI matches the second PRI and the first time gap matches the second time gap.

In Example 29, the method of any of Examples 1-28 further includes that the UE transmits the HARQ feedback using the first PRI and the first time gap and transmits the CSI report using the second PRI and the second time gap if the first PRI is different than the second PRI or if the first time gap is different than the second time gap.

Example 30 is an apparatus for wireless communication at a user equipment (UE), comprising: means for receiving downlink communication that triggers a channel state information (CSI) report; means for determining whether to report CSI together with hybrid automatic repeat request (HARQ) feedback; and means for transmitting the CSI and the HARQ feedback based on the determining whether to report the CSI together with the HARQ feedback.

In Example 31, the apparatus of Example 30 further includes means to perform the method of any of Examples 2-29.

Example 32 is an apparatus for wireless communication at a user equipment (UE), comprising: a memory; and at least one processor coupled to the memory and configured to perform the method of any of Examples 1-29.

Example 33 is a computer-readable medium storing computer executable code for wireless communication at a user equipment (UE), the code when executed by a processor cause the processor to perform the method of any of Examples 1-29.

Example 34 is a method of wireless communication at a base station, comprising: transmitting downlink communication that triggers a channel state information (CSI) report; indicating to the UE whether to report CSI together with hybrid automatic repeat request (HARQ) feedback; and receiving the CSI and the HARQ feedback based on the indication.

In Example 35, the method of Example 34 further includes that the base station receives the CSI together with the HARQ feedback.

In Example 36, the method of Example 34 or Example 35 further includes that the base station receives the CSI and the HARQ feedback using a timing for the HARQ feedback.

In Example 37, the method of any of Examples 34-36 further includes that the base station receives the CSI together with the HARQ feedback using the timing for the HARQ feedback based on a relationship between a CSI computation time and the timing for the HARQ feedback.

In Example 38, the method of any of Examples 34-37 further includes that the base station receives the CSI together with the HARQ feedback using the timing for the HARQ feedback based on the CSI report being a reduced CSI report.

In Example 39, the method of any of Examples 34-38 further includes that the reduced CSI report is based on one or more of a physical downlink shared channel (PDSCH) or a downlink demodulation reference signal (DM-RS).

In Example 40, the method of any of Examples 34-39 further includes that the reduced CSI report comprises a wideband CSI report with no more than two channel state information reference signal (CSI-RS) ports in a single resource.

In Example 41, the method of any of Examples 34-40 further includes that the base station receives the CSI and the HARQ feedback using a timing for the CSI feedback.

In Example 42, the method of any of Examples 34-41 further includes that the base station receives the CSI together with the HARQ feedback using the timing for the CSI based on the timing for the CSI being greater than a HARQ feedback timing.

In Example 43, the method of any of Examples 34-42 further includes that the timing for the CSI feedback comprises a timeline for reporting the CSI together with the HARQ feedback.

In Example 44, the method of any of Examples 34-43 further includes that the base station receives the CSI using different control channel resources than the HARQ feedback.

In Example 45, the method of any of Examples 34-44 further includes that the base station transmits an indication of a reporting mode to the UE, and wherein the base station receives the CSI together with the HARQ feedback based on the indication of the reporting mode.

In Example 46, the method of any of Examples 34-45 further includes that the indication is transmitted in radio resource control (RRC) signaling to the UE.

In Example 47, the method of any of Examples 34-46 further includes that the indication is based on at least one of: a type of a downlink triggered CSI report, a CSI process identifier (ID), a modulation and coding scheme used for scheduling a physical downlink shared channel (PDSCH), the CSI being triggered by a first grant scheduling an initial transmission, the CSI being triggered by a second grant scheduling a retransmission, a first number of layers for a PDSCH transmission, a second number of transport blocks for the PDSCH transmission, a third number of resource blocks for the PDSCH transmission, sub-band CSI reporting being configured for the UE, or wideband CSI reporting being configured for the UE.

In Example 48, the method of any of Examples 34-47 further includes that the indication is transmitted in downlink control information (DCI).

In Example 49, the method of any of Examples 34-48 further includes that the base station receives the CSI together with the HARQ feedback based on an amount of time between the downlink communication that triggers the CSI report and an uplink control channel resource for transmission of the CSI report.

In Example 50, the method of any of Examples 34-49 further includes that the base station receives a reduced CSI report together with the HARQ feedback when the amount of time is less than a first threshold, or receives the CSI using different control channel resources than the HARQ feedback when the amount of time is less than a second threshold.

In Example 51, the method of any of Examples 34-50 further includes that the base station receives a configured CSI report together with the HARQ feedback when the amount of time is more than the first threshold.

In Example 52, the method of any of Examples 34-51, further comprising: transmitting a physical uplink control channel resource indication (PRI) and a time gap between a physical downlink shared channel transmission and the HARQ feedback, wherein the base station receives the CSI together with the HARQ feedback using resources indicated by the PRI and the time gap.

In Example 53, the method of any of Examples 34-52, further comprising: transmitting, in downlink control information (DCI), a physical uplink control channel resource indication (PRI) and a time gap between a physical downlink shared channel (PDSCH) transmission and the HARQ feedback in downlink, wherein the CSI report is triggered by unsuccessful decoding of the PDSCH transmission, and wherein the base station receives the HARQ feedback using resources indicated by the PRI and the time gap.

In Example 54, the method of any of Examples 34-53 further includes that the base station receives the CSI report using an offset applied to the resources indicated by one or more of the PRI and the time gap.

In Example 55, the method of any of Examples 34-54, further comprising: transmitting, in the DCI, at least one of an additional PRI or an additional time gap, wherein the base station receives the CSI report using additional resources indicated by the at least one of the additional PRI or the additional time gap.

In Example 56, the method of any of Examples 34-55 further includes that the base station transmits an indication of a reporting mode from a base station, the method further comprising: transmitting, in downlink control information (DCI), at least one physical uplink control channel resource indication (PRI) and at least one time gap, wherein the base station receives the CSI and the HARQ feedback based on the indication of the reporting mode, the at least one PRI and the at least one time gap.

In Example 57, the method of any of Examples 34-56 further includes that the base station indicates to transmit the CSI separately from the HARQ feedback and the DCI indicates a first PRI and a first time gap and at least one of a second PRI or a second time gap, and wherein the base station receives the HARQ feedback using the first PRI and the first time gap and receives the CSI report using the at least one of the second PRI or the second time gap.

In Example 58, the method of any of Examples 34-57 further includes that the base station indicates to transmit the CSI together with the HARQ feedback and the DCI indicates multiple PRIs or multiple time gaps, and wherein the base station receives the CSI and the HARQ feedback using one of the multiple PRIs or one of the multiple time gaps.

In Example 59, the method of any of Examples 34-58 further includes that the base station indicates to transmit the CSI together with the HARQ feedback and the DCI indicates one PRI and one time gap, and wherein the base station receives the CSI and the HARQ feedback using the one PRI and the one time gap.

In Example 60, the method of any of Examples 34-59 further includes that the base station indicates to transmit the CSI separately from the HARQ feedback and the DCI indicates a PRI and a time gap, and wherein the base station receives the HARQ feedback using the PRI and the time gap and receives the CSI using an offset applied to at least one of the PRI and the time gap.

In Example 61, the method of any of Examples 34-60, further comprising: transmitting, in downlink control information (DCI), a first physical uplink control channel resource indication (PRI) and a first time gap, wherein a codepoint of the DCI is associated with a second PRI and a second time gap, and wherein the base station receives the CSI report together with the HARQ feedback if the first PRI matches the second PRI and the first time gap matches the second time gap.

In Example 62, the method of any of Examples 34-61 further includes that the base station receives the HARQ feedback using the first PRI and the first time gap and receives the CSI report using the second PRI and the second time gap if the first PRI is different than the second PRI or if the first time gap is different than the second time gap.

Example 63 is an apparatus for wireless communication at a base station, comprising: means for transmitting downlink communication that triggers a channel state information (CSI) report; means for indicating to the UE whether to report CSI together with hybrid automatic repeat request (HARQ) feedback; and means for receiving the CSI and the HARQ feedback based on the indication.

In Example 64, the apparatus of Example 63 further include means to perform the method of any of Examples 35-62.

Example 65 is an apparatus for wireless communication at a base station, comprising: a memory; and at least one processor coupled to the memory and configured to perform the method of any of Examples 34-62.

Example 66 is a computer-readable medium storing computer executable code for wireless communication at a base station, the code when executed by a processor cause the processor to perform the method of any of Examples 34-62.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving a physical uplink control channel resource indication (PRI) and a time gap between a physical downlink shared channel transmission and a hybrid automatic repeat request (HARQ) feedback,
    receiving downlink communication that triggers a channel state information (CSI) report;
    determining whether to report CSI together with the HARQ feedback; and
    transmitting the CSI and the HARQ feedback based on the determining whether to report the CSI together with the HARQ feedback, wherein the UE transmits the CSI together with the HARQ feedback using resources indicated by the PRI and the time gap.

2. The method of claim 1, wherein the UE determines to report the CSI together with the HARQ feedback using a timing for the HARQ feedback based on a relationship between a CSI computation time and the timing for the HARQ feedback, or based on the CSI report being a reduced CSI report, or
    wherein the UE determines to report the CSI together with the HARQ feedback using a timing for the CSI feedback, based on the timing for the CSI feedback being greater than a HARQ feedback timing, or based on the timing for the CSI feedback comprising a timeline for reporting the CSI together with the HARQ feedback.

3. The method of claim 1, further comprising:
    receiving an indication of a reporting mode from a network entity, wherein the UE determines whether to report the CSI together with the HARQ feedback based on the indication of the reporting mode.

4. The method of claim 3, wherein the indication is based on at least one of:
    a type of a downlink triggered CSI report,
    a CSI process identifier (ID),
    a modulation and coding scheme used for scheduling a physical downlink shared channel (PDSCH),
    the CSI being triggered by a first grant scheduling an initial transmission,
    the CSI being triggered by a second grant scheduling a retransmission,
    a first number of layers for a PDSCH transmission,
    a second number of transport blocks for the PDSCH transmission,
    a third number of resource blocks for the PDSCH transmission,
    sub-band CSI reporting being configured for the UE, or
    wideband CSI reporting being configured for the UE.

5. The method of claim 1, wherein the UE determines whether to report the CSI together with the HARQ feedback based on an amount of time between the downlink communication that triggers the CSI report and an uplink control channel resource for transmission of the CSI report.

6. The method of claim 1, further comprising:
receiving, in downlink control information (DCI), a physical uplink control channel resource indication (PRI) and a time gap between a physical downlink shared channel (PDSCH) transmission and the HARQ feedback in downlink, wherein the CSI report is triggered by unsuccessful decoding of the PDSCH transmission, and wherein the UE transmits the HARQ feedback using resources indicated by the PRI and the time gap.

7. The method of claim 1, further comprising:
receiving an indication of a reporting mode from a network entity, wherein the UE determines whether to report the CSI together with the HARQ feedback based on the indication of the reporting mode; and
receiving, in downlink control information (DCI), at least one physical uplink control channel resource indication (PRI) and at least one time gap, wherein the UE transmits the CSI and the HARQ feedback based on the indication of the reporting mode, the at least one PRI and the at least one time gap.

8. The method of claim 1, further comprising:
receiving, in downlink control information (DCI), a first physical uplink control channel resource indication (PRI) and a first time gap, wherein a codepoint of the DCI is associated with a second PRI and a second time gap, and
wherein the UE transmits the CSI report together with the HARQ feedback if the first PRI matches the second PRI and the first time gap matches the second time gap.

9. A method of wireless communication at a network entity, comprising:
transmitting a physical uplink control channel resource indication (PRI) and a time gap between a physical downlink shared channel transmission and a hybrid automatic repeat request HARQ) feedback;
transmitting downlink communication that triggers a channel state information (CSI) report from a user equipment (UE);
indicating to the UE whether to report CSI together with the HARQ feedback; and
receiving the CSI and the HARQ feedback based on the indication, wherein the network entity receives the CSI together with the HARQ feedback using resources indicated by the PRI and the time gap.

10. The method of claim 9, wherein the network entity receives the CSI together with the HARQ feedback using a timing for the HARQ feedback based on a relationship between a CSI computation time and the timing for the HARQ feedback, or based on the CSI report being a reduced CSI report, or
wherein the network entity receives the CSI together with the HARQ feedback using a timing for the CSI feedback based on the timing for the CSI feedback being greater than a HARQ feedback timing, or based on the timing for the CSI feedback comprising a timeline for reporting the CSI together with the HARQ feedback.

11. The method of claim 9, wherein the network entity transmits an indication of a reporting mode to the UE, and wherein the network entity receives the CSI together with the HARQ feedback based on the indication of the reporting mode, and wherein the indication is based on at least one of:
a type of a downlink triggered CSI report,
a CSI process identifier (ID),
a modulation and coding scheme used for scheduling a physical downlink shared channel (PDSCH),
the CSI being triggered by a first grant scheduling an initial transmission,
the CSI being triggered by a second grant scheduling a retransmission,
a first number of layers for a PDSCH transmission,
a second number of transport blocks for the PDSCH transmission,
a third number of resource blocks for the PDSCH transmission,
sub-band CSI reporting being configured for the UE, or wideband CSI reporting being configured for the UE.

12. The method of claim 9, further comprising:
transmitting, in downlink control information (DCI), a physical uplink control channel resource indication (PRI) and a time gap between a physical downlink shared channel (PDSCH) transmission and the HARQ feedback in downlink, wherein the CSI report is triggered by unsuccessful decoding of the PDSCH transmission, and wherein the network entity receives the HARQ feedback using resources indicated by the PRI and the time gap.

13. The method of claim 9, further comprising:
transmitting, in downlink control information (DCI), a first physical uplink control channel resource indication (PRI) and a first time gap, wherein a codepoint of the DCI is associated with a second PRI and a second time gap, and
wherein the network entity receives the CSI report together with the HARQ feedback if the first PRI matches the second PRI and the first time gap matches the second time gap.

14. An apparatus for wireless communication at a user equipment (UE), comprising:
a memory; and
a processor coupled to the memory and configurable to:
receive a physical uplink control channel resource indication (PRI) and a time gap between a physical downlink shared channel transmission and a hybrid automatic repeat request (HARQ) feedback;
receive downlink communication that triggers a channel state information (CSI) report;
determine whether to report CSI together with HARQ feedback; and
transmit the CSI and the HARQ feedback based on the determining whether to report the CSI together with the HARQ feedback, wherein the UE transmits the CSI together with the HARQ feedback using resources indicated by the PRI and the time gap.

15. The apparatus of claim 14, wherein the UE determines to report the CSI together with the HARQ feedback using a timing for the HARQ feedback based on a relationship between a CSI computation time and the timing for the HARQ feedback, or based on the CSI report being a reduced CSI report, or
wherein the UE determines to report the CSI together with the HARQ feedback using a timing for the CSI feedback, based on the timing for the CSI feedback being greater than a HARQ feedback timing, or based on the timing for the CSI feedback comprising a timeline for reporting the CSI together with the HARQ feedback.

16. The apparatus of claim 14, wherein the processor is further configurable to:
receive an indication of a reporting mode from a network entity, wherein the UE determines whether to report the CSI together with the HARQ feedback based on the indication of the reporting mode.

17. The apparatus of claim 14, wherein the indication is based on at least one of:
  a type of a downlink triggered CSI report,
  a CSI process identifier (ID),
  a modulation and coding scheme used for scheduling a physical downlink shared channel (PDSCH),
  the CSI being triggered by a first grant scheduling an initial transmission,
  the CSI being triggered by a second grant scheduling a retransmission,
  a first number of layers for a PDSCH transmission,
  a second number of transport blocks for the PDSCH transmission,
  a third number of resource blocks for the PDSCH transmission,
  sub-band CSI reporting being configured for the UE, or wideband CSI reporting being configured for the UE.

18. The apparatus of claim 14, wherein the UE determines whether to report the CSI together with the HARQ feedback based on an amount of time between the downlink communication that triggers the CSI report and an uplink control channel resource for transmission of the CSI report.

19. The apparatus of claim 14, wherein the processor is further configurable to:
  receive, in downlink control information (DCI), a physical uplink control channel resource indication (PRI) and a time gap between a physical downlink shared channel (PDSCH) transmission and the HARQ feedback in downlink, wherein the CSI report is triggered by unsuccessful decoding of the PDSCH transmission, and wherein the UE transmits the HARQ feedback using resources indicated by the PRI and the time gap.

20. The apparatus of claim 14, wherein the processor is further configurable to:
  receive an indication of a reporting mode from a network entity, wherein the UE determines whether to report the CSI together with the HARQ feedback based on the indication of the reporting mode; and
  receive, in downlink control information (DCI), at least one physical uplink control channel resource indication (PRI) and at least one time gap, wherein the UE transmits the CSI and the HARQ feedback based on the indication of the reporting mode, the at least one PRI and the at least one time gap.

21. The apparatus of claim 14, wherein the processor is further configurable to:
  receive, in downlink control information (DCI), a first physical uplink control channel resource indication (PRI) and a first time gap, wherein a codepoint of the DCI is associated with a second PRI and a second time gap, and
  wherein the UE transmits the CSI report together with the HARQ feedback if the first PRI matches the second PRI and the first time gap matches the second time gap.

22. An apparatus for wireless communication at a network entity, comprising:
  a memory; and
  a processor coupled with the memory and configurable to:
    transmit a physical uplink control channel resource indication (PRI) and a time gap between a physical downlink shared channel transmission and a hybrid automatic repeat request (HARQ) feedback;
    transmit downlink communication that triggers a channel state information (CSI) report from a user equipment (UE);
    indicate to the UE whether to report CSI together with the HARQ feedback; and
    receive the CSI and the HARQ feedback based on the indication, wherein the network entity receives the CSI together with the HARQ feedback using resources indicated by the PRI and the time gap.

23. The apparatus of claim 22, wherein the network entity receives the CSI together with the HARQ feedback using a timing for the HARQ feedback based on a relationship between a CSI computation time and the timing for the HARQ feedback, or based on the CSI report being a reduced CSI report, or
  wherein the network entity receives the CSI together with the HARQ feedback using a timing for the CSI feedback based on the timing for the CSI feedback being greater than a HARQ feedback timing, or based on the timing for the CSI feedback comprising a timeline for reporting the CSI together with the HARQ feedback.

24. The apparatus of claim 22, wherein the network entity transmits an indication of a reporting mode to the UE, and wherein the network entity receives the CSI together with the HARQ feedback based on the indication of the reporting mode, and wherein the indication is based on at least one of:
  a type of a downlink triggered CSI report,
  a CSI process identifier (ID),
  a modulation and coding scheme used for scheduling a physical downlink shared channel (PDSCH),
  the CSI being triggered by a first grant scheduling an initial transmission,
  the CSI being triggered by a second grant scheduling a retransmission,
  a first number of layers for a PDSCH transmission,
  a second number of transport blocks for the PDSCH transmission,
  a third number of resource blocks for the PDSCH transmission,
  sub-band CSI reporting being configured for the UE, or wideband CSI reporting being configured for the UE.

25. The apparatus of claim 22, wherein the processor is further configurable to:
  transmit, in downlink control information (DCI), a physical uplink control channel resource indication (PRI) and a time gap between a physical downlink shared channel (PDSCH) transmission and the HARQ feedback in downlink, wherein the CSI report is triggered by unsuccessful decoding of the PDSCH transmission, and wherein the network entity receives the HARQ feedback using resources indicated by the PRI and the time gap.

26. The apparatus of claim 22, wherein the processor is further configurable to:
  transmit, in downlink control information (DCI), a first physical uplink control channel resource indication (PRI) and a first time gap, wherein a codepoint of the DCI is associated with a second PRI and a second time gap, and
  wherein the network entity receives the CSI report together with the HARQ feedback if the first PRI matches the second PRI and the first time gap matches the second time gap.

* * * * *